(12) United States Patent
Matsusaka

(10) Patent No.: US 7,215,482 B2
(45) Date of Patent: May 8, 2007

(54) VARIABLE MAGNIFICATION OPTICAL SYSTEM, IMAGE TAKING LENS DEVICE AND DIGITAL APPARATUS

(75) Inventor: Keiji Matsusaka, Osaka (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 62 days.

(21) Appl. No.: 11/155,166

(22) Filed: Jun. 17, 2005

(65) Prior Publication Data
US 2005/0286138 A1 Dec. 29, 2005

(30) Foreign Application Priority Data
Jun. 25, 2004 (JP) ............................. 2004-188852

(51) Int. Cl.
*G02B 15/14* (2006.01)
*G02B 13/16* (2006.01)
*H04N 5/262* (2006.01)

(52) U.S. Cl. ................... 359/682; 359/680; 348/240.3; 348/335

(58) Field of Classification Search ............ 348/240.3, 348/335, 376; 359/680, 681, 682
See application file for complete search history.

(56) References Cited

U.S. PATENT DOCUMENTS 6,888,683 B2* 5/2005 Itoh ........................... 359/686
7,145,732 B2* 12/2006 Matsusaka et al. .......... 359/689
2002/0149857 A1 10/2002 Nobe ........................... 359/676
2003/0058548 A1 3/2003 Itoh ............................. 359/686
2004/0080655 A1 4/2004 Watanabe et al. ........... 348/335
2005/0259333 A1* 11/2005 Matsusaka ................... 359/680
2006/0245075 A1* 11/2006 Lee .............................. 359/680
2006/0245078 A1* 11/2006 Kawamura .................. 359/689

FOREIGN PATENT DOCUMENTS

JP        2002-169089 A      6/2002

* cited by examiner

*Primary Examiner*—David N. Spector
(74) *Attorney, Agent, or Firm*—Sidley Austin LLP

(57) ABSTRACT

There are provided a first lens group having a negative optical power as a whole, second and third lens groups having positive optical powers as a whole, which are located in this order from the object side. These lens groups are all configured to be movable in the optical axis direction during magnification. The first lens group is constituted by a bi-concave lens having a negative optical power and a positive meniscus lens which is convex at the object side thereof, which are located in this order from the object side. The second lens group is constituted by a bi-convex lens having a positive optical power and a bi-concave power having a negative optical power, which are located in this order from the object side and bonded to each other to constitute a cemented lens. The third lens group is constituted by a bi-convex lens having a positive optical power. The first and fifth lenses are double-aspherical lenses formed from resin and the third and fourth lenses are single-aspherical lenses.

32 Claims, 18 Drawing Sheets

Embodiment 1,4,7

Embodiment 2

Embodiment 3

Embodiment 5

Embodiment 6

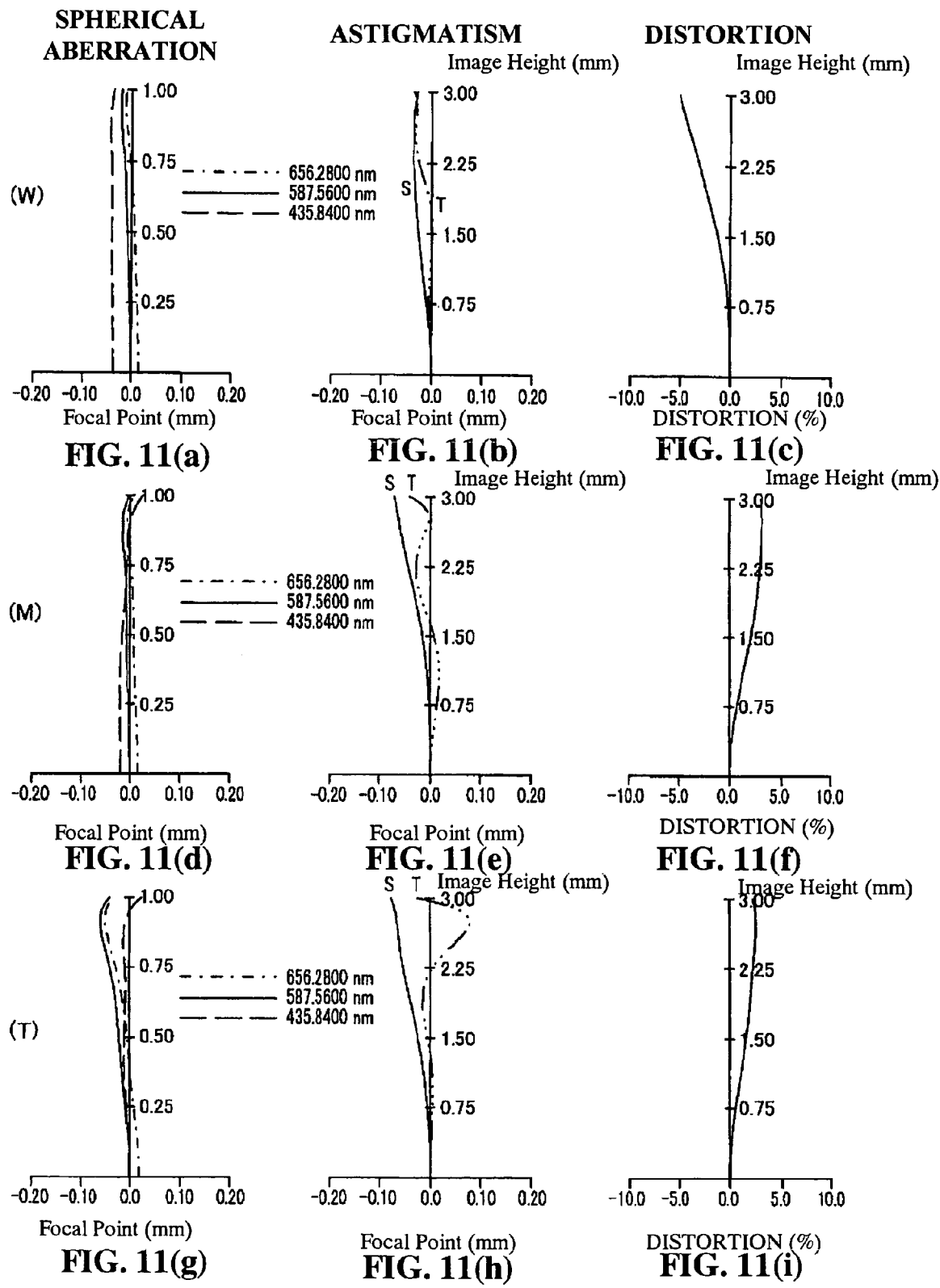

| SPHERICAL ABERRATION | ASTIGMATISM | DISTORTION |
|---|---|---|
| 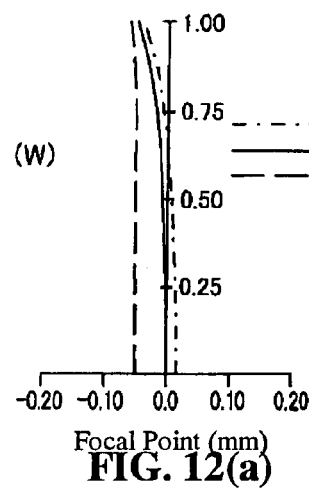 FIG. 12(a) | 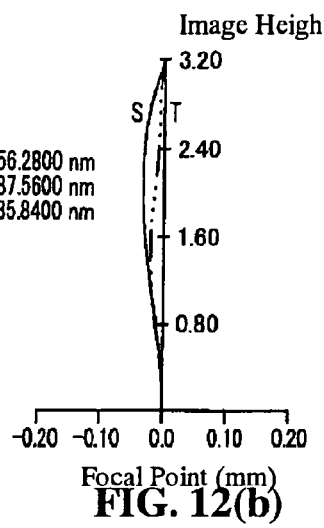 FIG. 12(b) | 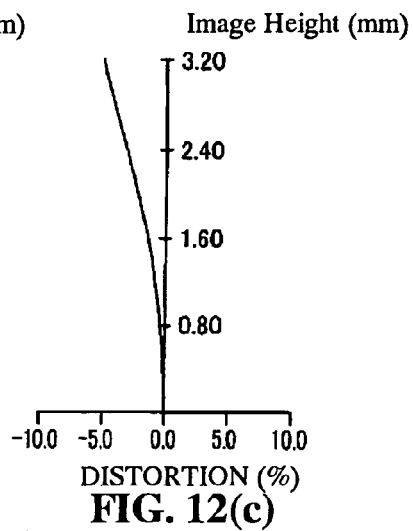 FIG. 12(c) |
| 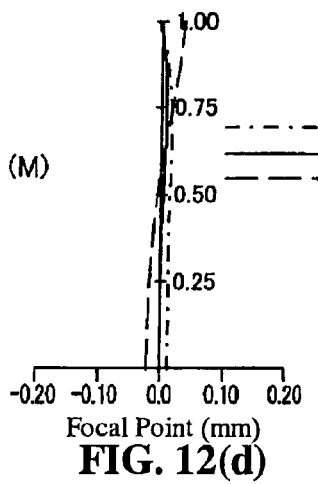 FIG. 12(d) | 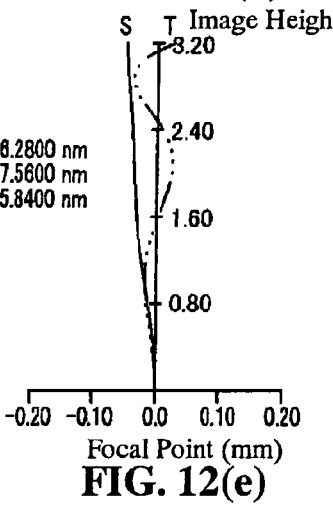 FIG. 12(e) | 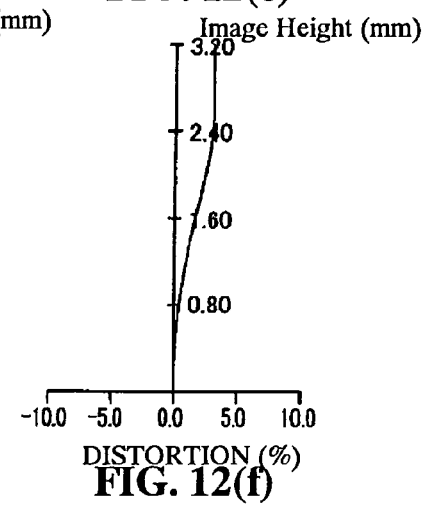 FIG. 12(f) |
| 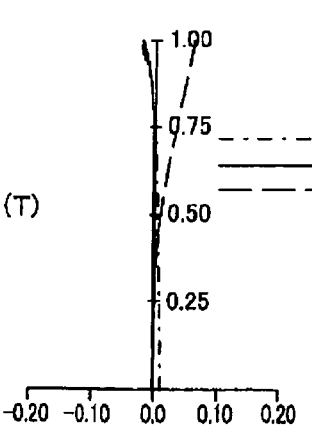 FIG. 12(g) | 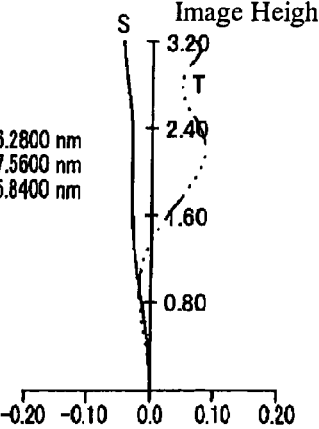 FIG. 12(h) | 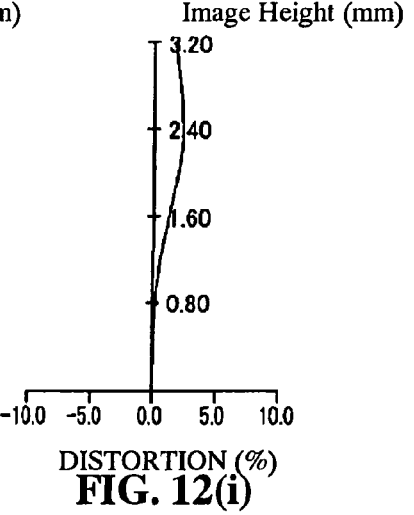 FIG. 12(i) |

| SPHERICAL ABERRATION | ASTIGMATISM | DISTORTION |
(W) 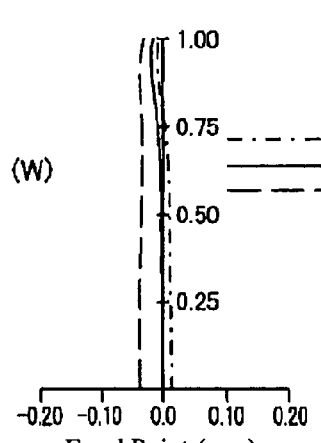 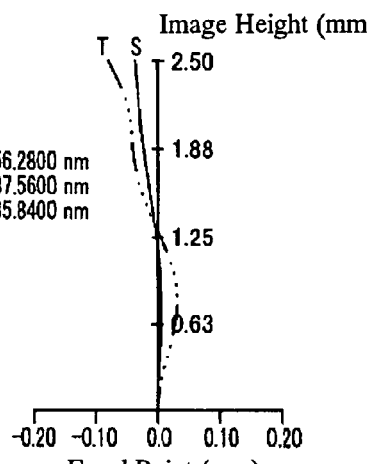 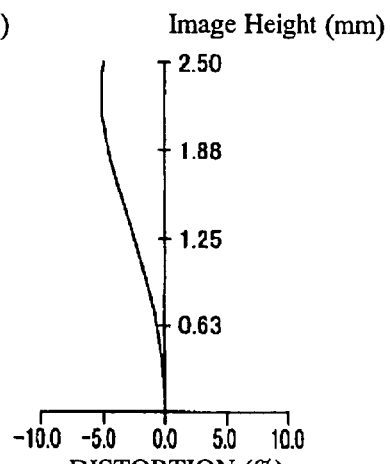
FIG. 13(a)  FIG. 13(b)  FIG. 13(c)
(M) 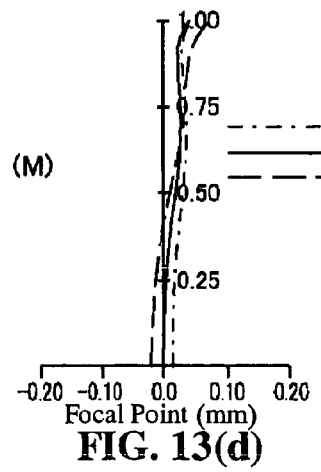 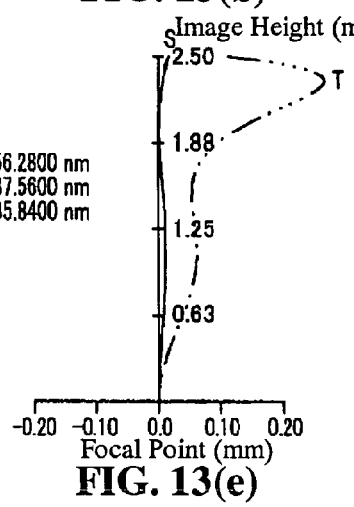 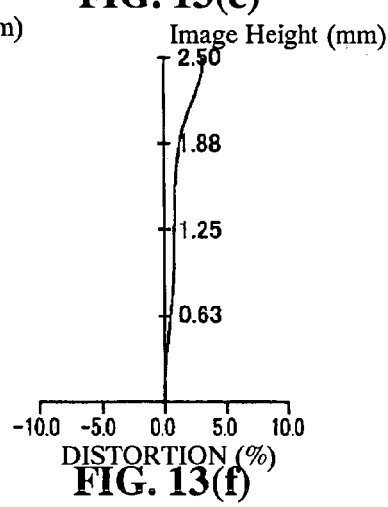
FIG. 13(d)  FIG. 13(e)  FIG. 13(f)
(T) 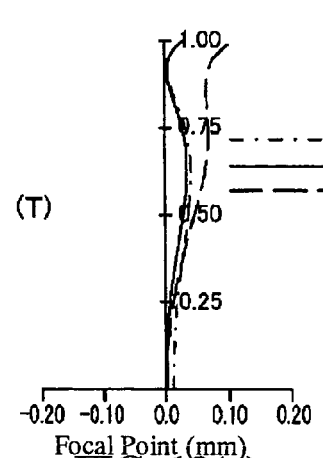 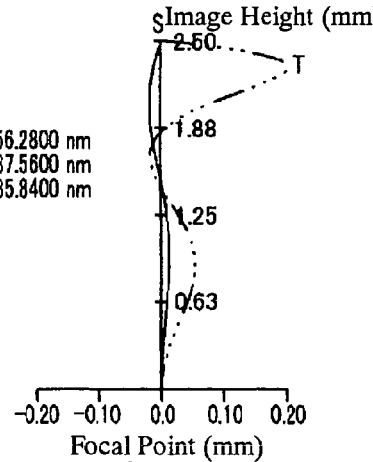 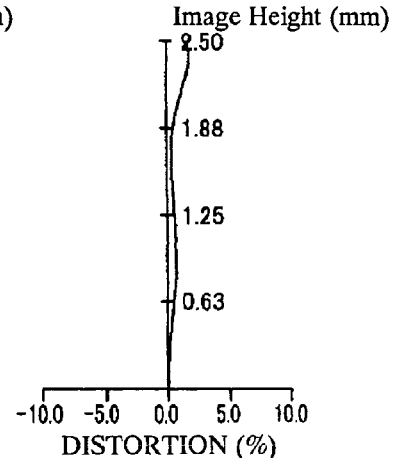
FIG. 13(g)  FIG. 13(h)  FIG. 13(i)

| SPHERICAL ABERRATION | ASTIGMATISM | DISTORTION |
|---|---|---|

| SPHERICAL ABERRATION | ASTIGMATISM | DISTORTION |
|---|---|---|
| 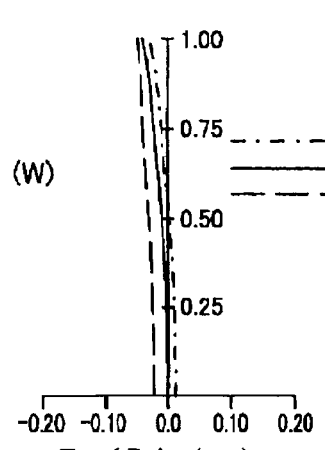 FIG. 15(a) | 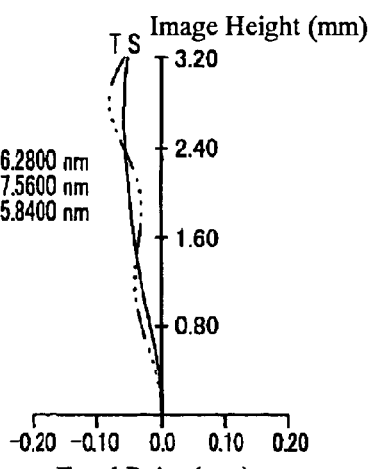 FIG. 15(b) | 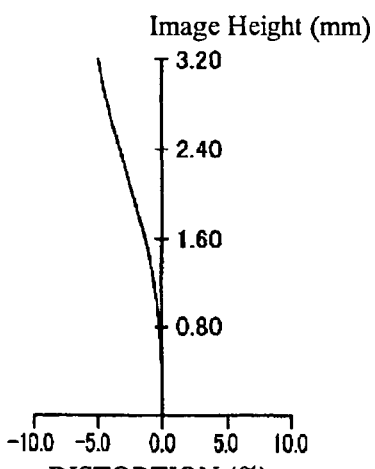 FIG. 15(c) |
| 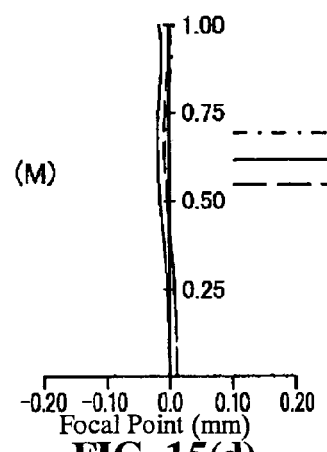 FIG. 15(d) | 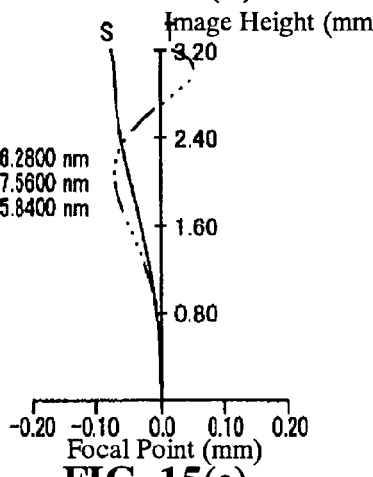 FIG. 15(e) | 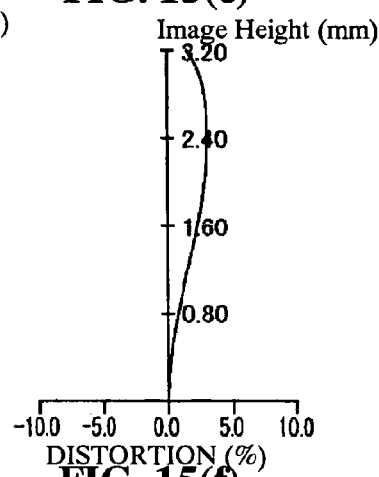 FIG. 15(f) |
| 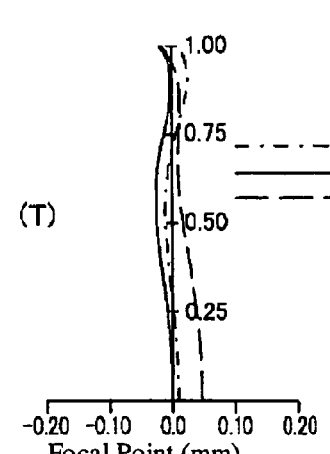 FIG. 15(g) | 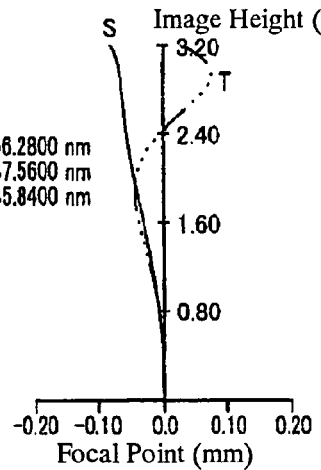 FIG. 15(h) | 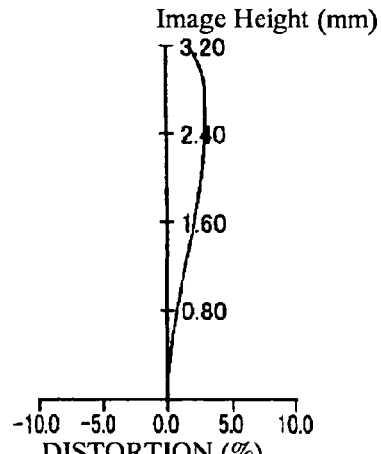 FIG. 15(i) |

| SPHERICAL ABERRATION | ASTIGMATISM | DISTORTION |

| SPHERICAL ABERRATION | ASTIGMATISM | DISTORTION |
|---|---|---|
| 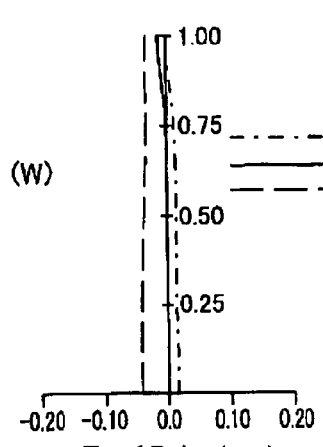 FIG. 17(a) | 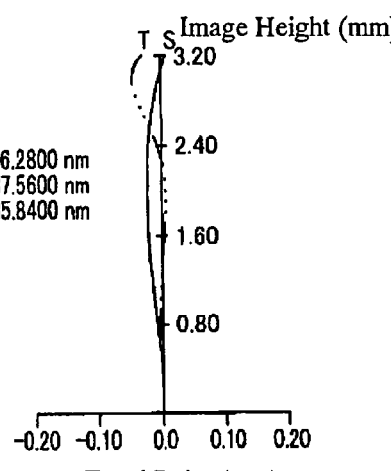 FIG. 17(b) | 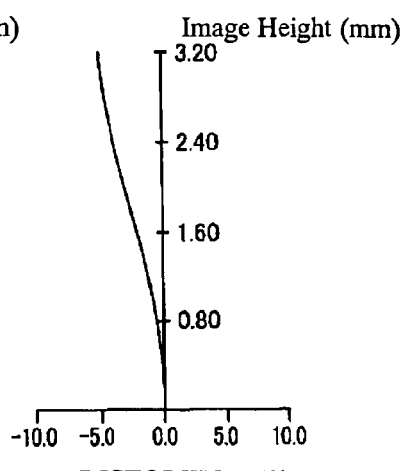 FIG. 17(c) |
| 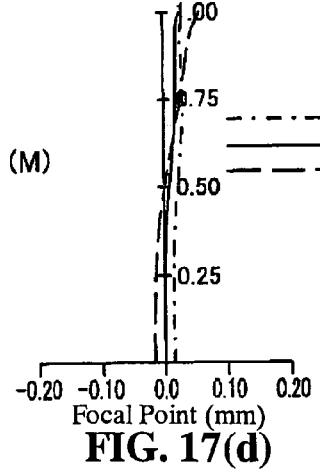 FIG. 17(d) | 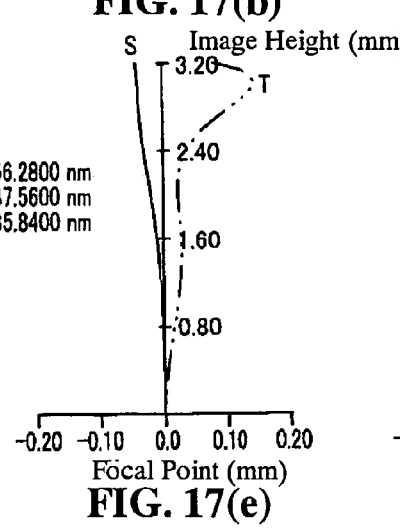 FIG. 17(e) | 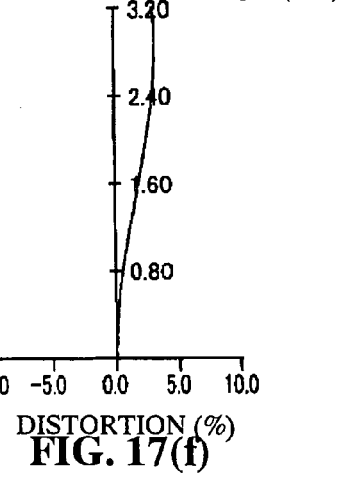 FIG. 17(f) |
| 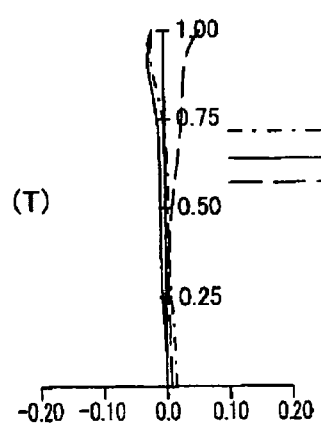 FIG. 17(g) | 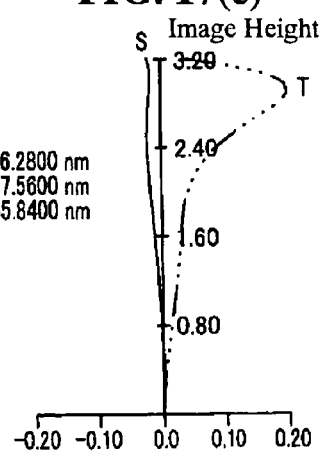 FIG. 17(h) | 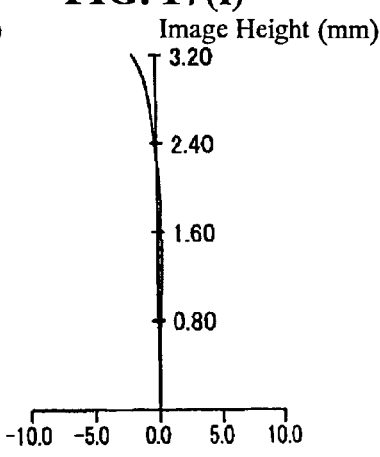 FIG. 17(i) |

VARIABLE MAGNIFICATION OPTICAL SYSTEM, IMAGE TAKING LENS DEVICE AND DIGITAL APPARATUS

The present application claims priority to Japanese Patent Application No. 2004-188852 filed Jun. 25, 2004, the entire content of which is hereby incorporated by reference.

BACKGROUND OF THE INVENTION

1. Field of the Invention

The present invention relates to variable magnification optical systems which are constituted by plural lens groups and capable of magnification by varying the spacing of the respective lens groups in the optical axis direction, an image taking lens device including the variable magnification optical system and digital apparatus incorporating the image taking lens device.

2. Description of the Related Art

In recent years, widespread use of portable phones and portable information terminals (PDA: Personal Digital Assistant) have been remarkable, and furthermore such devices incorporating a compact digital still camera unit or digital video unit have become common. Since there are severe constraints on the size and cost of these devices, it is common to employ an image taking lens device including a single focus optical system consisting of one to three plastic lenses and an image pickup device having a small size and a small number of pixels in comparison with digital still cameras and so on which are independent products.

However, such a single focus optical system has magnification ratios equivalent to those of vision and enables photographing of only objects near the photographer. In view of this point, at the present time where high-pixel and high-function image pickup device have been rapidly developed, there is a need for a compact variable magnification optical system which is applicable to a high-pixel image pickup device, capable of photographing an object far from the photographer and mountable to a portable phone, etc.

There have been various types of suggestions about such variable magnification optical system, as the following patent literatures JP-A No. 2002-169089, US-A No. 2002-149857, US-A No. 2003-58548 and US-A No. 2004-80655 for example.

The US-A No. 2003-58548 describes a variable magnification optical system including a first lens group having a negative optical power and second, third and fourth lens groups having positive optical powers, which are placed in this order from the object side, namely having a so-called four components which are negative, positive, positive, positive components, wherein the refracting powers and the materials of the respective lens groups are determined for the sake of providing excellent optical characteristics to the zoom lenses over the entire magnification range and wide angles of view while simplifying the lens system.

The US-A No. 2002-149857 describes a variable magnification optical system with three components, or negative, positive and positive components, wherein the refracting power of the second lens group is determined for the sake of compactness of the variable magnification optical system. The JP-A No. 2002-169089 discloses a technique which, in a variable magnification optical system with two components or negative and positive components, provides at least one aspherical surface in a negative lens in the latter group, for the sake of compactness of the variable magnification optical system.

The US-A No. 2004-80655 suggests a technique which, in a variable magnification optical system with two components or negative and positive components, places a light-quantity adjusting filter at a different position from the aperture stop having a fixed shape for the sake of alleviating the influence of diffractions and reducing the total optical length.

The patent literatures JP-A No. 2002-169089, US-A No. 2002-149857, US-A No. 2003-58548 and US-A No. 2004-80655 have points to be improved respectively. Namely, the variable magnification optical system in the USP-A No. 2003-58548 includes many lenses and thus is inferior in the compactness, which makes it difficult to mount it on a portable phone or portable information terminal which are required to be miniaturized. The variable magnification optical system in the US-A No. 2002-149857 is made compact to some degree. However, in order to mount it on a portable phone or portable information terminal, the compactness thereof must be further enhanced. If an attempt is made to enhance the compactness of the variable magnification optical system of the US-A No. 2002-149857, this will increase the difficulty of fabrication of lenses due to the high decentration error sensitivity of the first lens group.

The variable magnification optical system of the JP-A No. 2002-169089 causes large residual aberrations and particularly causes insufficient corrections of astigmatisms. With the variable magnification optical system of the US-A No. 2004-80655, the error sensitivity of the second group becomes extremely high, thus making it difficult to adjust the spacing of lenses and also fabricate aspherical lenses.

SUMMARY OF THE INVENTION

It is a main object of the present invention to provide compact variable magnification optical systems and image taking lens devices which are capable of exhibiting excellent optical performance and are mountable to portable phones or portable information terminals while suppressing the increase of the cost, and digital apparatus incorporating such an image taking lens device.

In order to attain the objects and other objects, according to an aspect of the present invention, a variable magnification optical system creates optical images of objects on the light-receptive surface of an image taking device for converting optical images into electrical signals and performs magnification by varying the spacing of respective lens groups in the optical axis direction, and the variable magnification optical system includes a first lens group including plural lenses and at least one aspherical surface and having a negative optical power and a second lens group having a positive optical power, which are placed in this order from the object side, wherein the variable magnification optical system is configured such that the spacing between the first lens group and the second lens group is reduced for magnification from the wide-angle end to the telephoto end and the following conditions are satisfied.

$$\Delta N1max \geq 0.35 \quad (1)$$

$$0.7 < f2/fw < 2 \quad (2)$$

$$Lb/fw < 1 \quad (3)$$

$\Delta N1max$: the maximum value, out of the absolute values of the refractive index difference between two lenses, for all possible combinations of two lenses out of the lenses of the first lens group.

f2: the total focal length of the second lens group.

fw: the total focal length of the entire optical system at the wide-angle end.

Lb: the distance between the peak point of the lens surface having a power which is most proximal to the image pickup device and the surface of the image pickup device along the optical axis at the telephoto end (the distance is calculated assuming that the medium existing at the region between the lens surface and the surface of the image pickup device is air).

According to another aspect of the present invention, a variable magnification optical system creates optical images of objects on the light-receptive surface of an image pickup device for converting optical images into electrical signals and performs magnification by varying the spacing of respective lens groups in the optical axis direction, and the variable magnification optical system includes a first lens group having a negative optical power and a second lens group having a positive optical power, which are placed in this order from the object side, wherein the variable magnification optical system is configured such that the spacing between the first lens group and the second lens group is reduced for magnification from the wide-angle end to the telephoto end and the following conditions are satisfied.

$Nmax \geq 1.9$ $0.7 < f2/fw < 2$

Nmax: the refractive index of a lens having a largest refractive index, out of the lenses in the variable magnification optical system.

f2: the total focal length of the second lens group.

fw: the total focal length of the entire optical system at the wide-angle end.

According to a further aspect of the present invention, a variable magnification optical system creates optical images of objects on the light-receptive surface of an image pickup device for converting optical images into electrical signals and performs magnification by varying the spacing of respective lens groups in the optical axis direction, and the variable magnification optical system includes a first lens group having a negative optical power and a second lens group having a positive optical power, which are placed in this order from the object side, the first lens group including a meniscus lens which is convex at the object side thereof, includes at least one aspherical surface and has a positive optical power, wherein the variable magnification optical system is configured such that the spacing between the first lens group and the second lens group is reduced for magnification from the wide-angle end to the telephoto end and the following conditions are satisfied.

$Nasp \geq 1.85$ $0.7 < f2/fw < 2$

Nasp: the refractive index of a lens having a largest refractive index, out of the lenses having an aspherical surface.

f2: the total focal length of the second lens group.

fw: the total focal length of the entire optical system at the wide-angle end.

The invention itself, together with further objects and attendant advantages, will best be understood by reference to the following detailed description taken in conjunction with the accompanying drawings.

BRIEF DESCRIPTION OF THE DRAWINGS

FIGS. 11(A) to 11(I) are views of aberrations illustrating the spherical aberration, the astigmatism and the distortion aberrations of the lens groups in the variable magnification optical system according to the first embodiment;

FIGS. 12(A) to 12(I) are views of aberrations illustrating the spherical aberration, the astigmatism and the distortion aberrations of the lens groups in the variable magnification optical system according to the second embodiment;

FIGS. 13(A) to 13(I) are views of aberrations illustrating the spherical aberration, the astigmatism and the distortion aberrations of the lens groups in the variable magnification optical system according to the third embodiment;

FIGS. 15(A) to 15(I) are views of aberrations illustrating the spherical aberration, the astigmatism and the distortion aberrations of the lens groups in the variable magnification optical system according to the fifth embodiment;

FIGS. 17(A) to 17(I) are views of aberrations illustrating the spherical aberration, the astigmatism and the distortion aberrations of the lens groups in the variable magnification optical system according to the seventh embodiment.

In the following description, like parts are designated by like reference numbers throughout the several drawing.

DETAILED DESCRIPTION OF THE PREFERRED EMBODIMENTS

Figures 18A, 18B:
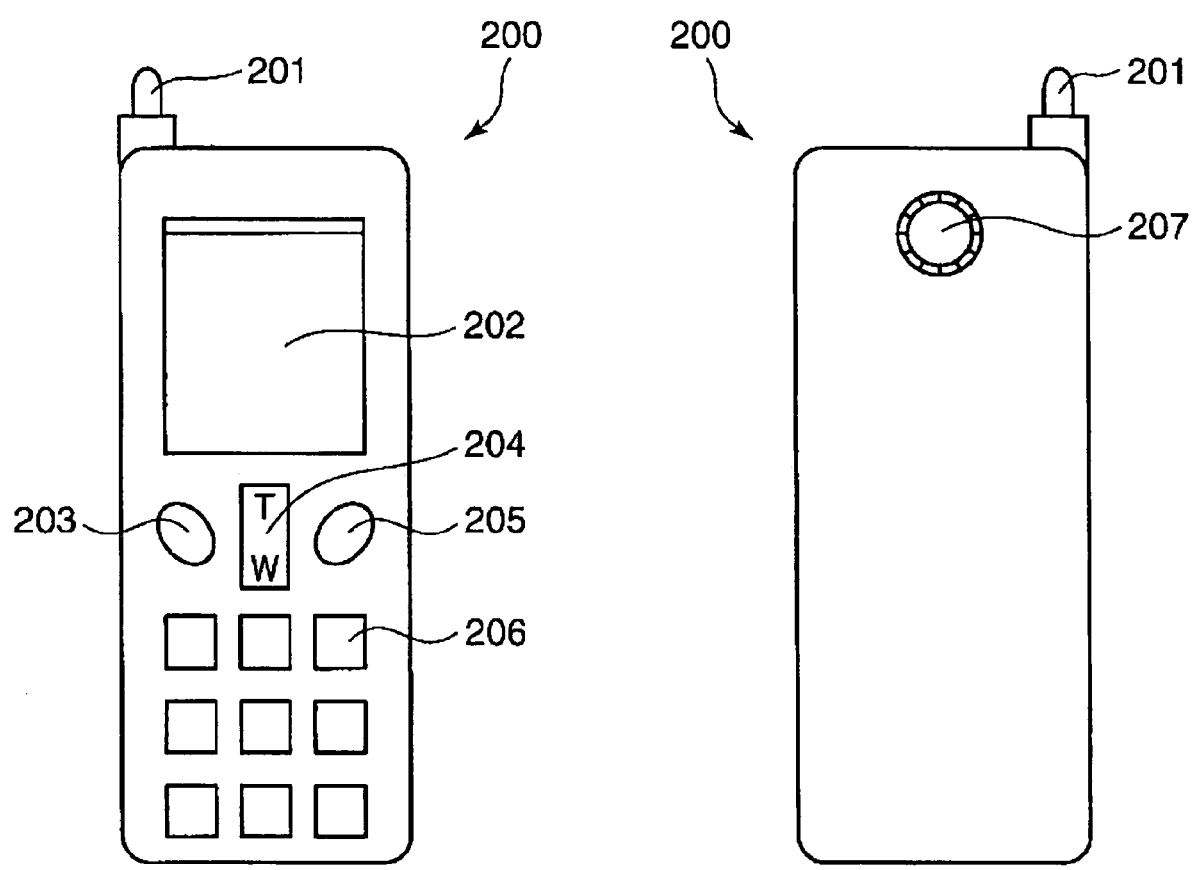
FIG. 18(a) is an external structural view illustrating the operation surface of a camera-equipped portable phone incorporating a variable magnification optical system according to the present invention.
FIG. 18(b) is an external structural view illustrating the opposite surface of the operation surface of the camera-equipped portable phone incorporating the variable magnification optical system according to the present invention.

FIG. 18(a) and FIG. 18(b) are external structural views of a camera-equipped portable phone illustrating an embodiment of a digital apparatus according to the present invention. Here, digital apparatus include portable information terminals (PDA: Personal Digital Assistants), personal computers, mobile computers, or peripheral equipment for them in the present invention. Digital still cameras and digital video cameras are image taking lens devices for optically capturing images of objects, then converting the images into electrical signals with semiconductor devices and storing them as digital data in a storing medium such as a flash memory. Further, the present invention includes portable phones, portable information terminals, personal computers, mobile computers and peripheral equipment for them which incorporate a compact image taking lens device for optically capturing static or moving images of objects.

FIG. 18(a) illustrates an operation surface of a portable phone and FIG. 18(b) illustrates the surface opposite to the operation surface, namely the rear surface. The portable phone main body 200 includes an antenna 201 at its upper part, a display 202 on its operation surface, an image switching button 203 for performing activation of an image shooting mode and for switching between static-image shooting and moving-image shooting, and a magnification button 204 for controlling magnification (zooming) according to the present invention, a shutter button 205 and dial buttons 206. The magnification button 204 includes a print of "T" indicating the telephoto end at its upper part and a print of "W" indicating the wide-angle end at its lower part and is constituted by a two-contact-point type switch, etc., which enables giving instructions of the respective magnification operations by pressing the printed positions. Further, the portable phone main body 200 incorporates an image taking lens device (camera) 207 constituted by a variable power optical system according to the present invention and includes an image taking lens exposed at the rear surface.

When a static image is to be photographed, first, the image switching button 203 is pressed to activate the image shooting mode. Here, it is assumed that, by pressing the image switching button 203 once, it can be switched to the moving-image shooting mode. When the static-image shooting mode is activated, images of the object are periodically and repeatedly photographed by an image pickup device such as a CCD through the image taking lens device 207, and the images are transferred to a memory for display and then sent to the display 202. By looking at the display 202, the position of a main object in the screen can be adjusted such that it stays in a desired position. By pushing the shutter button 205 at this state, a static image can be captured. Namely, image data is stored in the memory for static images.

In the case where zoom-photographing is to be performed in order to enlarge an object far from the photographer or an object near the photographer, by pushing the T-printed portion of the magnification button 204 at the upper end thereof, this condition is detected and the lenses are activated for magnification in accordance with the time during which it is pushed so that continuous zooming is performed. Also, in the case where it is required that the enlarging ratio of an object is reduced toward the same magnification such as when zooming has been excessively performed, by pushing the W-printed portion of the magnification button 204 at the lower end thereof, this condition is detected and continuous magnification is performed, up to the same magnification, in accordance with the time during which it is pushed. Thus, even when the object is far from the photographer, the magnification ratio can be adjusted using the magnification button 203. Also, by adjusting the position of the main object in the screen such that it stays at a desired position and then pushing the shutter button 205 similarly to normal photographing at the same magnification, an enlarged static image can be captured.

Further, in the case where a moving image is to be photographed, the image switching button 203 is pushed once to activate the static-image shooting mode, and then the image switching button 203 is pushed once again to switch it to the moving-image shooting mode. Then, similarly to static-image photographing, the position of the image of the object in the screen obtained through the image taking lens device 207 is adjusted such that it stays at a desired position by looking at the display 202. At this time, the enlarging ratio for the object can be adjusted using the magnification button 204. By pushing the shutter button 205 at this state, photographing of a moving image is started. During photographing, the enlarging ratio for the object can be changed any time by the magnification button 204. By pushing the shutter button 205 once again at this state, the photographing of the moving image is terminated. The moving image is introduced to the display memory for the display 202 and is also introduced and stored into a memory for moving images.

The magnification button 204 according to the present invention is not limited to this embodiment and the existing dial button 206 may be utilized or there may be an aspect configured so that a function capable of magnification in two enlargement and reduction directions such as a rotary dial having a rotational axis in the surface on which the dial button is arranged is provided.

The present invention is not limited to a portable phone and may be applied to other digital apparatus a digital still camera, a digital video camera, a portable information terminal, a personal computer, a mobile computer and peripheral devices thereof.

The image taking lens device 207 according to the present invention illustrated in FIG. 18(b) is constituted by a lens system for creating an optical image of an object, a parallel-plane plate corresponding to an optical low-pass filter, an image pickup device for converting the optical image created by the lens system into electrical signals, which are located in this order from the rear-surface side, namely from the object (the object for shooting) side. In order to enable photographing of objects far from the photographer, the lens system is strongly required to be a compact and high-performance variable magnification optical system capable of zooming. In a variable magnification optical system, a lens system as described above is constituted by plural lens groups, and the spacing of the respective lens groups can be varied in the optical axis direction to achieve magnification or focusing. The present invention relates to such a variable magnification optical system, an image taking lens device for creating, by utilizing the variable magnification optical system, optical images of objects on the light-receptive surface of an image pickup device which converts optical images into electric signals, and digital apparatus including the image taking lens device and the image pickup device and having the function of photographing static images or moving images.

Hereinafter, with reference to the drawings, there will be described variable magnification optical systems which constitute the image taking lens device 207 for the camera-equipped portable phone illustrated in FIG. 18(b), according to the present invention.

First Embodiment

Figure 1:
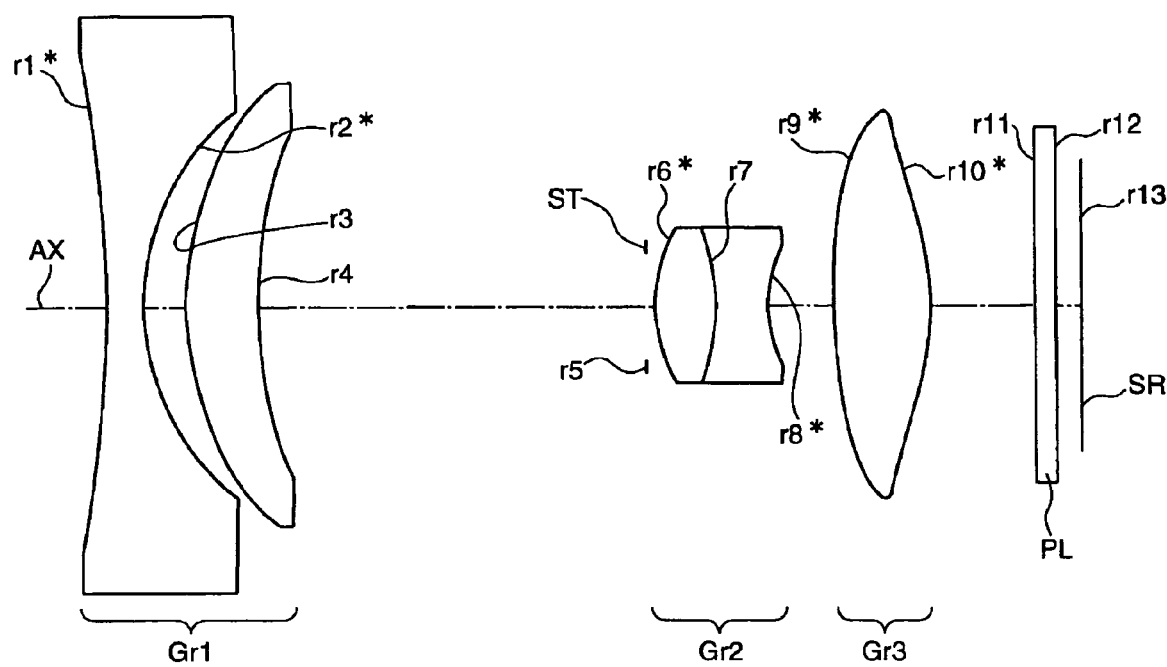
FIG. 1 is a cross sectional view of a variable magnification optical system along the optical axis, according to a first embodiment of the present invention.

FIG. 1 is a cross sectional view illustrating the arrangement of the lens groups in a variable magnification optical system according to the first embodiment, along the optical axis (AX). FIG. 1 and FIGS. 2 to 7 illustrate the arrangement of lenses at the wide-angle end. Hereinafter, optical power is defined as the power when the medium at the both sides of the lens surface is air.

The variable magnification optical system according to the present embodiment is constituted by a first lens group (Gr1) having a negative optical power as a whole, an optical stop (ST) for adjusting the amount of light, a second lens group (Gr2) having a positive optical power as a whole and a third lens group (Gr3) having a positive optical power, which are placed in this order from the object side (the left side in FIG. 1). In the present embodiment, all of them are configured to be movable in a optical axis direction for magnification. At the opposite side of the third lens group (Gr3) from the second lens group (Gr2), a parallel plane plate (PL) and an image pickup device (SR) are placed.

While in the present specification, the terms "convex", "concave" and "meniscus" hereinafter will be used for the shapes of lenses, they will represent the lens shapes near the optical axis (near the centers of lenses) and will not represent the shapes of entire lenses and the shapes near the lens edges. Although this will not become an issue for spherical lenses, notice must be taken for aspherical lenses since they have generally different shapes near the centers and near the edges thereof. Aspherical lenses are lenses having a paraboloid, an elliptical surface, a hyperboloid and a quartic surface, etc.

The first lens group (Gr1) is constituted by a bi-convex lens having a negative optical power, a positive meniscus lens which is convex at the object side thereof (a lens having a positive optical power), which are located in this order from the vicinity of the object. The second lens group (Gr2) is constituted by a bi-convex lens having a positive optical power and a bi-concave lens having a negative optical power, which are located in this order from the vicinity of the object, wherein the bi-convex lens and the bi-concave lens are bonded to each other to constitute a cemented lens. The third lens group (Gr3) is constituted by a bi-convex lens having a positive optical power.

The number ri (i=1, 2, 3, . . . ), illustrated in FIG. 1, is the i-th lens surface which is counted from the object side (wherein the lens surfaces bonded to each other are counted as a single lens surface), and the surfaces designated by ri* are aspherical surfaces. Assuming that the respective lenses in the first to third lens groups (Gr1 to Gr3) are referred to as first to fifth lenses in order from closest to farthest from the object, the first lens and the fifth lens are double-aspherical lenses formed from resin and the third lens and the fourth lens are single-aspherical lenses.

In the configuration, an incident light ray from the object side in the figure passes through the first lens group, the second lens group and the third lens group (Gr1, Gr2, and Gr3) in order, thus creating an optical image of the object. The optical image created by these lens groups passes through the parallel plane plate (PL) placed adjacent to the third lens group (Gr3). At this time, the optical image is corrected to minimize so-called folded-back noise, which is caused when an optical image is converted into electrical signals by the image pickup device (SR).

The parallel plane plate (PL) corresponds to an optical low pass filter, an infrared cut filter, or a cover glass for the image pickup device. Finally, the optical image corrected by the parallel plane plate (PL) is converted into electrical signals by the image pickup device (SR). The electrical signals are subjected to predetermined digital image processing and image compression processing, etc., when required and then are stored in a memory of a portable phone or a portable information terminal as digital image signals or transmitted to other digital apparatus in a wire manner or a wire-less manner.

FIG. 10 is a schematic diagram illustrating the way of moving these lens groups during magnification. In FIG. 10, similarly to the figures, the left side is the object side and the first lens group (Gr1), the second lens group (Gr2) and the third lens group (Gr3) are arranged in this order from the object side. In the figure, the reference character W indicates states at the wide-angle end having a smallest focal length, namely a largest angle of view, while the reference character T indicates states at the telephoto end having a greatest focal length, namely a smallest angle of view. The reference character M indicates that a focal length is in the middle state (hereinafter, referred to as a middle point) between the wide-angle end (W) and the telephoto end (T). Further, in FIG. 10, there is also illustrated the way of moving the respective lens groups according to second and later embodiments described later, as well as the first embodiment.

In a variable magnification optical system having an optical power consisting of three components which are positive, positive and negative components, as in the present embodiment, magnification is carried out by the second lens group (Gr2). Therefore, the second lens group (Gr2) mainly has the optical power. However, with the compact variable magnification optical system according to the present invention, it is difficult to ensure magnification ratios of about 2 to 3 only the movement of the second lens group (Gr2). Therefore, the lens groups other than the second lens group (Gr2) are configured to be capable of carrying out magnification. In the first embodiment having the lens configuration as illustrated in FIG. 1, the first lens group (Gr1), the second lens group (Gr2) and the third lens group (Gr3) are all movable and can carry out magnification, correction of aberrations and adjustment of image points.

Hereinafter, the lens configuration according to second to seventh embodiments will be described in order, similarly to the first embodiment, with reference to the drawings. The reference characters in FIG. 2 to FIG. 7 have the same meanings as those in FIG. 1.

Second Embodiment

Figure 2:
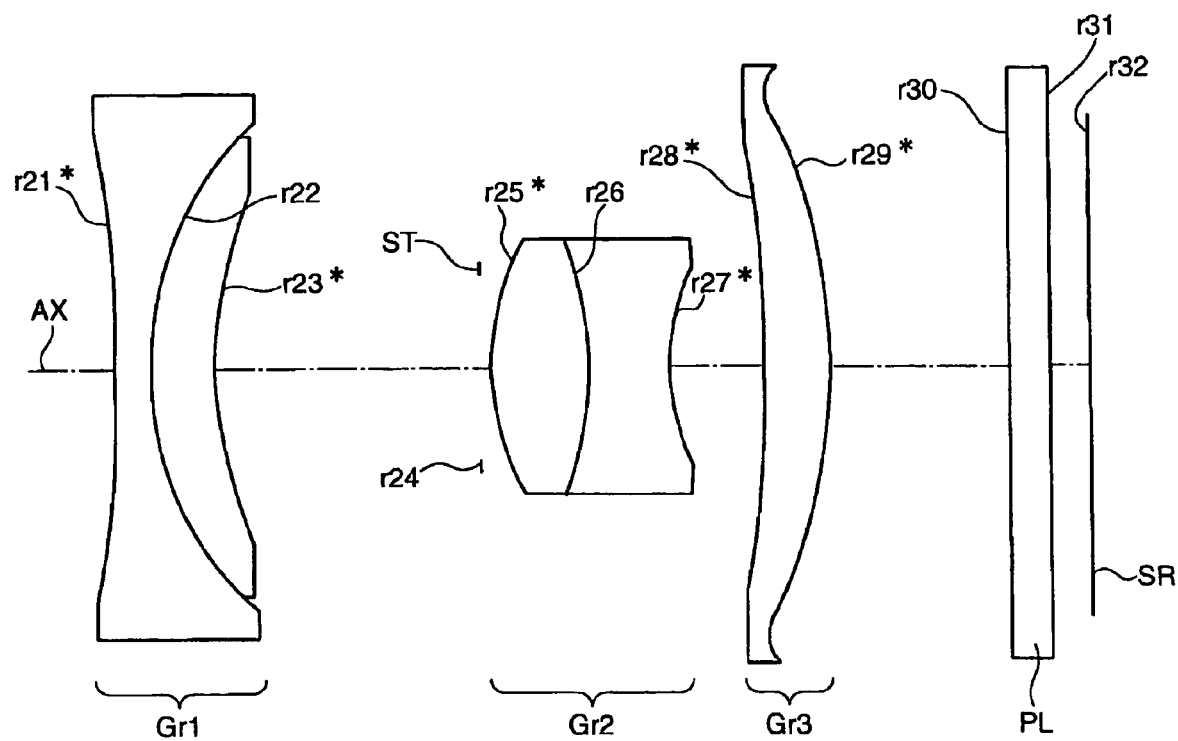
FIG. 2 is a cross sectional view of a variable magnification optical system along the optical axis, according to a second embodiment of the present invention.

FIG. 2 is a cross sectional view illustrating the arrangement of the lens groups in a variable magnification optical system according to a second embodiment, along the optical axis (AX). The variable magnification optical system according to the second embodiment is constituted by a first lens group (Gr1) having a negative optical power as a whole, an optical stop (ST) for adjusting the amount of light, a second lens group (Gr2) having a positive optical power as a whole and a third lens group (Gr3) having a positive optical power, which are placed in this order from the object side. In the present embodiment, the optical stop (ST), the second lens group (Gr2) and the third lens group (Gr3) are configured to be movable in the optical axis direction during magnification, while the first lens group (Gr1) is fixed in the optical axis direction.

The first lens group (Gr1) is constituted by a bi-concave lens having a negative optical power and a positive meniscus lens which is convex at the object side thereof (a lens having a positive optical power), which are placed in this order from the object side and bonded to each other to constitute a cemented lens. The second lens group (Gr2) is constituted by a bi-convex lens having a positive optical power and a bi-concave lens having a negative optical power, which are placed in this order from the object side. The third lens group (Gr3) is constituted by a positive meniscus lens which is convex at the image side thereof.

Assuming that the respective lenses in the first to third lens groups (Gr1 to Gr3) are referred to as first to fifth lenses in order from closest to farthest from the object, the first to fourth lenses are single-aspherical lenses and the fifth lens is a double-aspherical lens. In the second embodiment having a lens configuration as illustrated in FIG. 2, the first lens group (Gr1) is fixed during magnification, while the second lens group (Gr2) and the third lens group (Gr3) are moved to carry out magnification.

Third Embodiment

Figure 3:
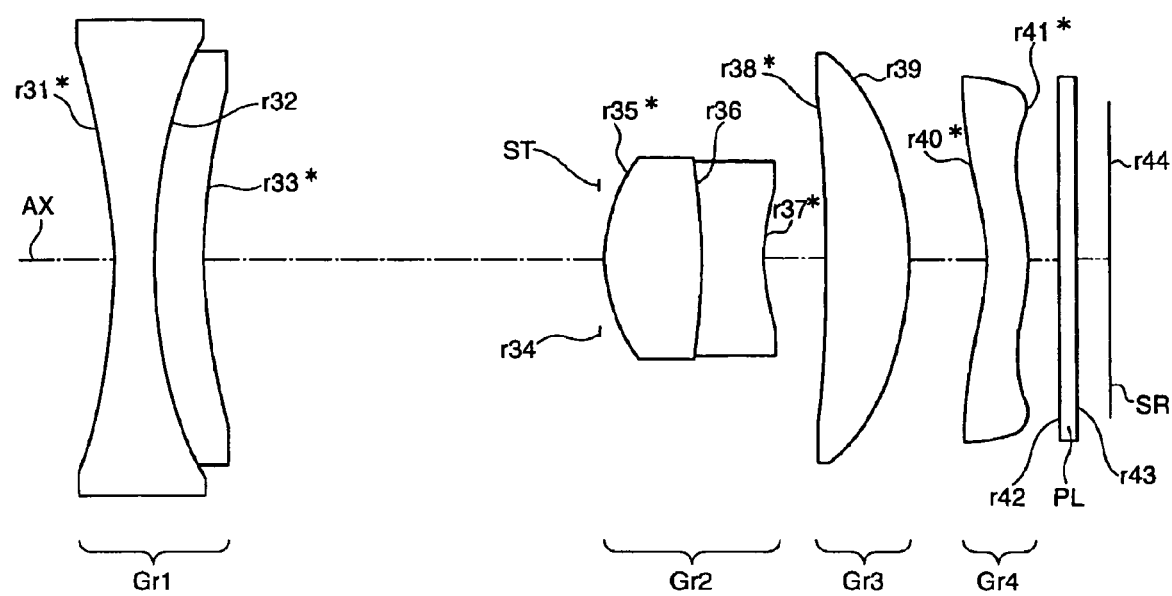
FIG. 3 is a cross sectional view of a variable magnification optical system along the optical axis, according to a third embodiment of the present invention.

FIG. 3 is a cross sectional view illustrating the arrangement of the lens groups in a variable magnification optical system according to the third embodiment, along the optical axis (AX). The variable magnification optical system according to the third embodiment is constituted by a first lens group (Gr1) having a negative optical power as a whole, an optical stop (ST) for adjusting the amount of light, a second lens group (Gr2) having a positive optical power as a whole, a third lens group (Gr3) having a positive optical power and a fourth lens group (Gr4) having a negative optical power, respective lens groups which are placed in this order from the object side. In the present embodiment, the first lens group (Gr1), the optical stop (ST), the second lens group (Gr2) and the third lens group (Gr3) are configured to be movable in the optical axis direction during magnification, while the fourth lens group (Gr4) is fixed in the optical axis direction.

The first lens group (Gr1) is constituted by a bi-concave negative lens and a positive meniscus lens which is convex at the object side thereof, which are placed in this order from the object side and bonded to each other to constitute a cemented lens. The second lens group (Gr2) is constituted by a bi-convex lens having a positive optical power and a bi-concave lens having a negative optical power, which are placed in this order from the object side and are bonded to each other to constitute a cemented lens. The third lens group (Gr3) is constituted by a positive meniscus lens which is convex at the image side thereof, and the fourth lens group (Gr4) is constituted by a negative meniscus lens which is convex at the image side thereof.

Assuming that the respective lenses in the first to third lens groups (Gr1 to Gr3)) are referred to as first to sixth lenses in order from closest to farthest from the object, the first to fifth lenses are single-aspherical lenses and the sixth lens is a double-aspherical lens. In the third embodiment having a lens configuration as illustrated in FIG. 3, the first lens group (Gr1), the second lens group (Gr2) and the third lens group (Gr3) are moved during magnification and they carry out magnification, correction of aberrations and adjustment of image points.

Fourth Embodiment

Figure 4:
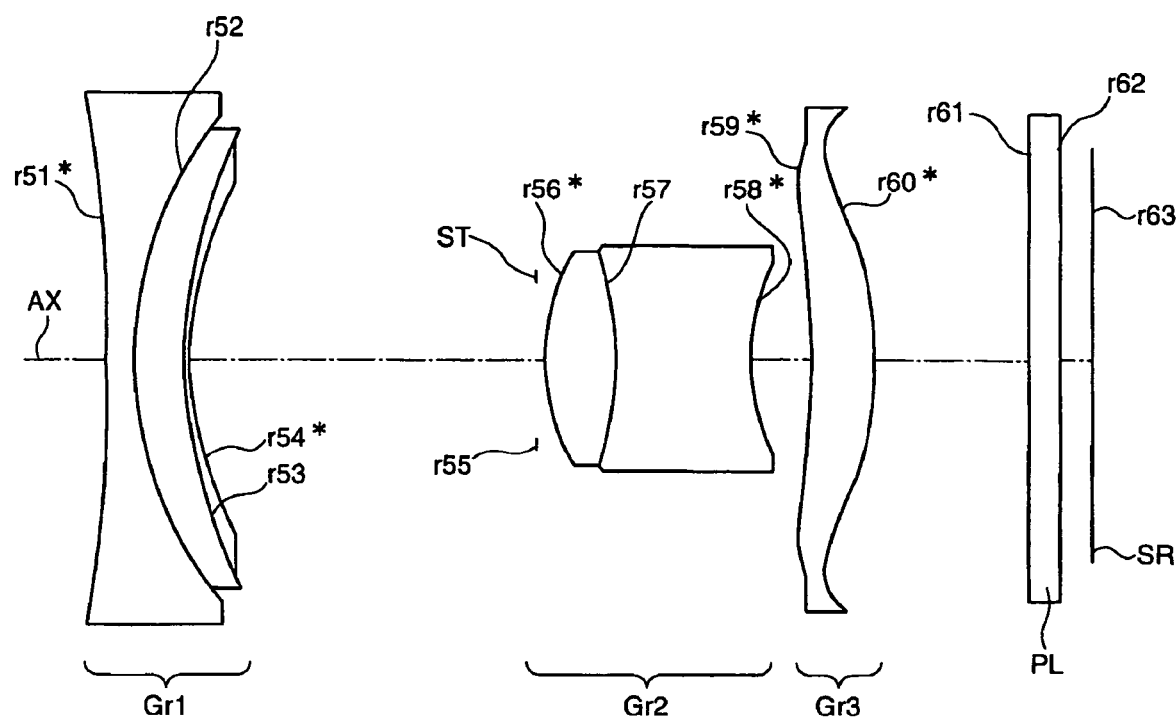
FIG. 4 is a cross sectional view of a variable magnification optical system along the optical axis, according to a fourth embodiment of the present invention.

FIG. 4 is a cross sectional view illustrating the arrangement of the lens groups in a variable magnification optical system according to the fourth embodiment, along the optical axis (AX). The variable magnification optical system according to the fourth embodiment is constituted by a first lens group (Gr1) having a negative optical power as a whole, an optical stop (ST) for adjusting the amount of light, a second lens group (Gr2) having a positive optical power as a whole, and a third lens group (Gr3) having a positive optical power, respective lens groups which are placed in this order from the object side. In the present embodiment, the first lens group (Gr1), the optical stop (ST), the second lens group (Gr2) and the third lens group (Gr3) are configured to be movable in the optical axis direction during magnification.

The first lens group (Gr1) is constituted by a biconcave negative lens and a positive meniscus lens which is convex at the object side thereof, which are placed in this order from the object side and bonded to each other to constitute a cemented lens. The second lens group (Gr2) is constituted by a bi-convex lens having a positive optical power and a biconcave lens having a negative optical power, which are placed in this order from the object side and bonded to each other to constitute a cemented lens. The third lens group (Gr3) is constituted by a positive meniscus lens which is convex at the image side thereof.

Assuming that the respective lenses in the first to third lens groups (Gr1 to Gr3)) are referred to as first to fifth lenses in order from closest to farthest from the object side, the first to fourth lenses are single-aspherical lenses while the fifth lens is a double-aspherical lens.

Further, the positive meniscus lens in the first lens group (Gr1) is a composite aspherical lens including a glass spherical lens as a base material and a thin resin layer applied on the surface thereof (the surface at the image surface side in FIG. 4), wherein the surface of the resin is formed into an aspherical surface with a die. The resin portion is not treated as a single optical member and the entire positive meniscus lens including the resin portion is regarded as a single lens. Further, it is assumed that the refractive index of the positive meniscus lens is the refractive index of the glass portion (the portion other than the resin portion) forming the base.

In the fourth embodiment having a lens configuration as illustrated in FIG. 4, the first lens group (Gr1), the second lens group (Gr2) and the third lens group (Gr3) are all moved during magnification and they carry out and they carry out magnification, correction of aberrations and adjustment of image points.

Fifth Embodiment

Figure 5:
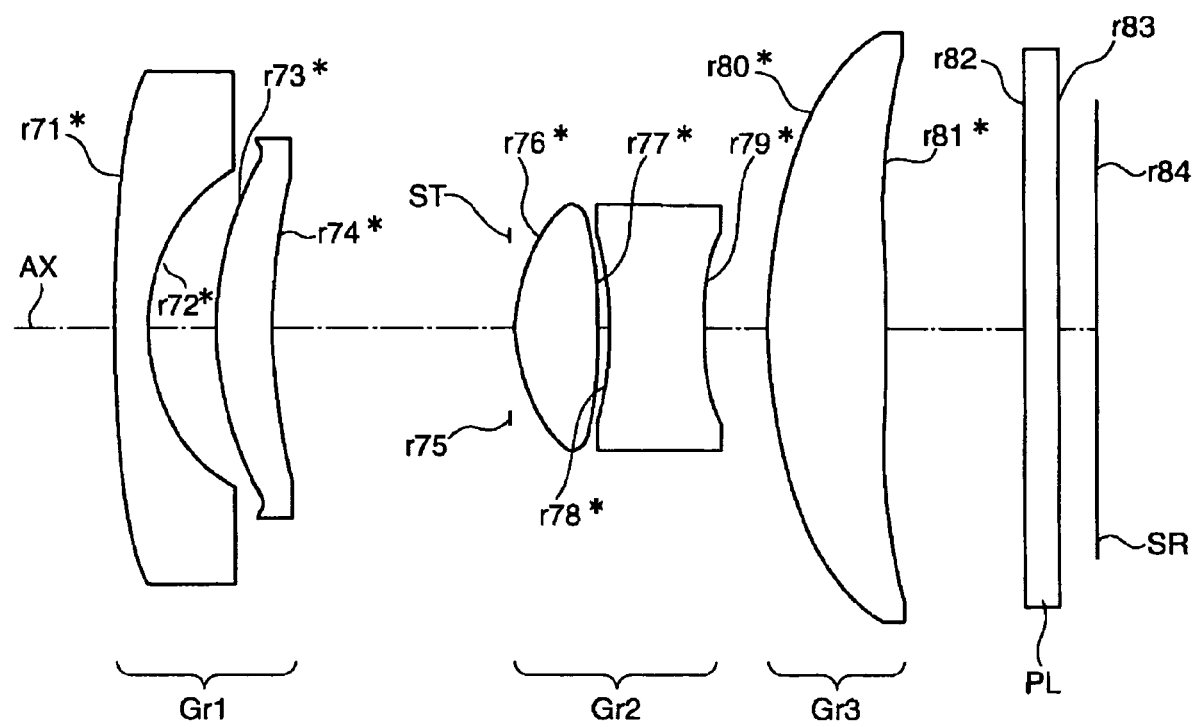
FIG. 5 is a cross sectional view of a variable magnification optical system along the optical axis, according to a fifth embodiment of the present invention.

FIG. 5 is a cross sectional view illustrating the arrangement of the lens groups in a variable magnification optical system according to the fifth embodiment, along the optical axis (AX). The variable magnification optical system according to the fifth embodiment is constituted by a first lens group (Gr1) having a negative optical power as a whole, an optical stop (ST) for adjusting the amount of light, a second lens group (Gr2) having a positive optical power as a whole, and a third lens group (Gr3) having a positive optical power, respective lens groups which are placed in this order from the object side. In the present embodiment, the first lens group (Gr1), the optical stop (ST), the second lens group (Gr2) and the third lens group (Gr3) are configured to be movable in the optical axis direction during magnification.

The first lens group (Gr1) is constituted by a positive meniscus lens which is convex at the object side thereof (a lens having a positive optical power) and a negative meniscus lens which is convex at the object side thereof (a lens having a negative optical power), which are placed in this order from the object side. The second lens group (Gr2) is constituted by a bi-convex lens having a positive optical power and a bi-concave lens having a negative-optical power, which are placed in this order from the object side. The third lens group (Gr3) is constituted by a bi-convex lens having a positive optical power.

The lenses in the first to third lens groups (Gr1 to Gr3) are all double-aspherical lenses.

In the fifth embodiment having a lens configuration as illustrated in FIG. 5, the first lens group (Gr1), the second lens group (Gr2) and the third lens group (Gr3) are all moved during magnification and they carry out magnification, correction of aberrations and adjustment of image points.

Sixth Embodiment

Figure 6:
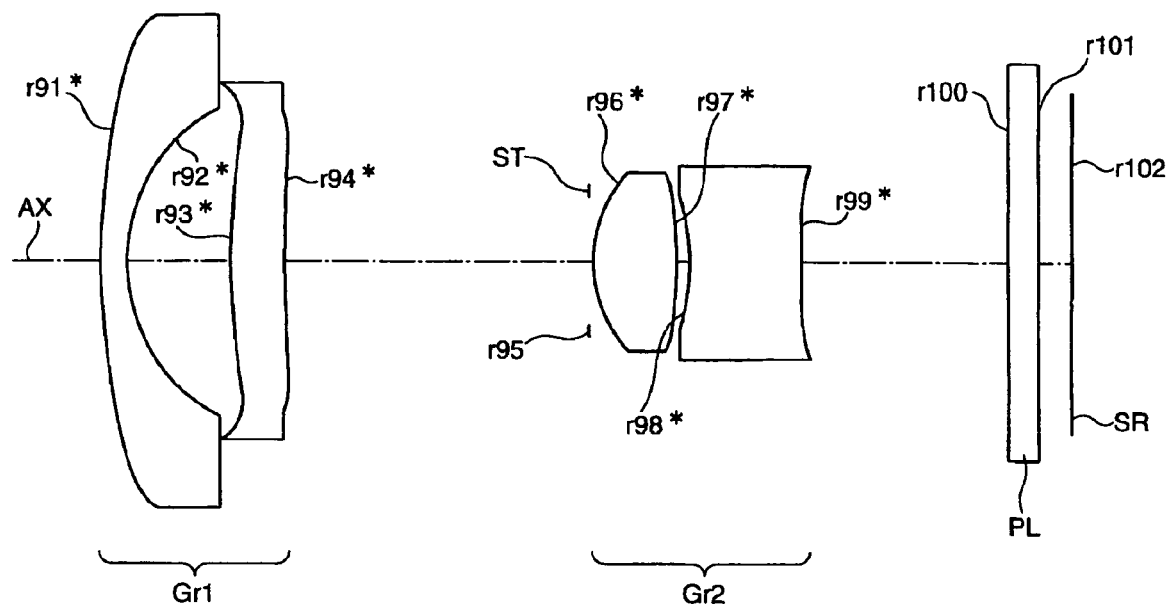
FIG. 6 is a cross sectional view of a variable magnification optical system along the optical axis, according to a sixth embodiment of the present invention.

FIG. 6 is a cross sectional view illustrating the arrangement of the lens groups in a variable magnification optical system according to the sixth embodiment, along the optical axis (AX). The variable magnification optical system according to the sixth embodiment is constituted by a first lens group (Gr1) having a negative optical power as a whole, an optical stop (ST) for adjusting the amount of light, and a second lens group (Gr2) having a positive optical power as a whole, respective lens groups which are placed in this order from the object side. In the present embodiment, the first lens group (Gr1), the optical stop (ST) and the second lens group (Gr2) are configured to be movable in the optical axis direction during magnification.

The first lens group (Gr1) is constituted by a negative meniscus lens which is convex at the object side thereof and a positive meniscus lens which is convex at the object side thereof, which are placed in this order from the object side. The second lens group (Gr2) is constituted by a bi-convex lens having a positive optical power and a negative meniscus lens which is convex at the image side thereof, which are placed in this order from the object side.

The lenses in the first and second lens groups are all double-aspherical lenses. In the sixth embodiment having a lens configuration as illustrated in FIG. 6, the first lens group (Gr1) and the second lens group (Gr2) are all moved during magnification, and they carry out magnification, correction of aberrations and adjustment of image points.

Seventh Embodiment

Figure 7:
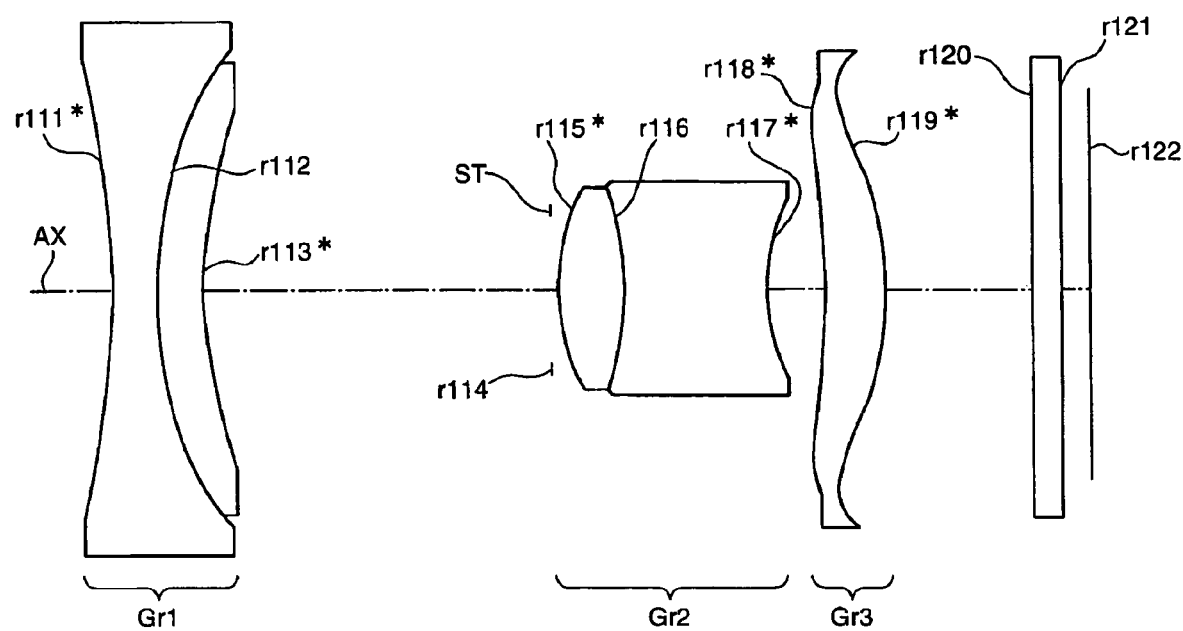
FIG. 7 is a cross sectional view of a variable magnification optical system along the optical axis, according to a seventh embodiment of the present invention.

FIG. 7 is a cross sectional view illustrating the arrangement of the lens groups in a variable magnification optical system according to the seventh embodiment, along the optical axis (AX). The variable magnification optical system according to the seventh embodiment is constituted by a first lens group (Gr1) having a negative optical power as a whole, an optical stop (ST) for adjusting the amount of light, a second lens group (Gr2) having a positive optical power as a whole, and a third lens group (Gr3) having a positive optical power as a whole, respective lens groups which are placed in this order from the object side. In the present embodiment, the first lens group (Gr1), the optical stop (ST), the second lens group (Gr2) and the third lens group (Gr3) are configured to be movable in the optical axis direction during magnification.

The first lens group (Gr1) is constituted by a negative bi-concave lens and a positive meniscus lens which is convex at the object side thereof (a lens having a positive optical lens), which are placed in order from the object side and bonded to each other to constitute a cemented lens. The second lens group (Gr2) is constituted by a bi-convex lens having a positive optical power and a bi-concave lens having a negative optical power, which are placed in order from the object side and are bonded to each other to constitute a cemented lens. The third lens group (Gr3) is constituted by a positive meniscus lens which is convex at the image side thereof.

Assuming that the respective lenses in the first to third lens groups (Gr1 to Gr3) are referred to as first to fifth lenses in order from closest to farthest from the object side, the first to fourth lenses are single-aspherical lenses and the fifth lens is a double-aspherical lens. In the seventh embodiment having a lens configuration as illustrated in FIG. 7, the first lens group (Gr1), the second lens group (Gr2) and the third lens group (Gr3) are all moved during magnification and they carry out magnification, correction of aberrations and adjustment of image points.

Hereinafter, there will be described conditions or conditions of optical characteristics required for the lens system constituting the variable magnification optical system according to the present invention, and further there will be described the grounds for the conditions or the grounds for numerical ranges.

In a variable magnification optical system including a first lens group (Gr1) constituted by plural lenses having a negative optical power and a second lens group (Gr2) having a positive optical power, wherein the spacing between the first lens group (Gr1) and the second lens group (Gr2) is decreased during magnification from the wide-angle end to the telephoto end, and said first lens group includes at least one aspherical surface, it is desirable that the following conditions (1) to (3) are satisfied.

$$\Delta N1max \geqq 0.35 \qquad (1)$$

$$0.7 < f2/fw < 2 \qquad (2)$$

$$Lb/fw < 1 \qquad (3)$$

$\Delta N1max$: the maximum value, out of the absolute values of the refractive index difference between two lenses, for all possible combinations of two lenses out of the lenses of the first lens group (Gr1).

$f2$: the total focal length of the second lens group (Gr2).

$fw$: the total focal length of the entire optical system at the wide-angle end.

$Lb$: the distance between the peak point of the lens surface having a power which is most proximal to the image pickup device and the surface of the image pickup device along the optical axis at the telephoto end (the distance is calculated assuming that the medium existing at the region between the lens surface and the surface of the image pickup device is air).

This is because if ΔN1max is below the lower limit in the condition (1), the Petzval sum can not be reduced, thus resulting in insufficient corrections of field curvatures and astigmatisms. Further, when the upper limit of the condition (2) is exceeded, the optical power of the second lens group (Gr2) is too small, thereby making it difficult to provide magnification ratios of about two or three while maintaining the compactness. Also, when the value of f2/fw is below the lower limit of the condition (2), the decentration error sensitivity of the second lens group (Gr2) is significantly high, thus making the fabrication of the lenses difficult. Further, when the value of Lb/fw exceeds the upper limit of the condition (3), it is necessary to increase the negative optical power of the first lens group (Gr1) in order to ensure a long back focus, which will increase the curvature of the negative lens in the first lens group (Gr1) (or decrease the radius of curvature), making the fabrication of the lenses difficult.

Further, it is desirable that ΔN1max satisfies the following condition (1').

$$\Delta N1max \geq 0.4 \tag{1'}$$

This is because, by satisfying the condition (1'), the effects of correction of field curvatures and astigmatisms can be made more prominent, thus enabling further enhancing the compactness.

Further, it is desirable that the total focal lengths f2 and fw satisfy the following condition (2').

$$1 < f2/fw < 1.5 \tag{2'}$$

This is because when the upper limit of the condition (2') is exceeded, the optical power of the second lens group (Gr2) is small, thus requiring greater amounts of movement of the second lens group (Gr2) for magnification and requiring an increase of the total optical length. Further, when the value of f2/fw is below the lower limit in the condition (2'), the decentration error sensitivity of the second lens group (Gr2) is high, and it becomes necessary to perform adjustment among the lenses of the second lens group (Gr2) and between the second lens group (Gr2) and the other lens groups, thus involving increases of the cost.

Further, it is desirable that the total focal length fw and the distance Lb along the optical axis satisfy the following condition (3').

$$Lb/fw < 0.5 \tag{3'}$$

This is because, when the upper limit is exceeded in the condition (3'), the decentration error sensitivity of the first lens group (Gr1) is increased since the negative optical power of the first lens group (Gr1) is increased, thus involving increases of the cost required for assembly of the respective components of the variable magnification optical system.

Further, in the case where the first group includes at least one aspherical surface, it is desirable that the positive meniscus lens which is convex at the object side thereof in the first lens group (Gr1) has at least one aspherical surface. This is because such a configuration enables successful corrections of astigmatisms and distortion aberrations.

In a variable magnification optical system including a first lens group (Gr1) having a negative optical power and a second lens group (Gr2) having a positive optical power, which are placed in this order from the object side, wherein the spacing between the first lens group (Gr1) and the second lens group (Gr2) is reduced during magnification from the wide-angle end to the telephoto end, it is desirable that the following conditions (2), (4) are satisfied.

$$Nmax \geq 1.9 \tag{4}$$

$$0.7 < f2/fw < 2 \tag{2}$$

Nmax: the refractive index of a lens having a largest refractive index, out of the lenses in the variable magnification optical system.

This is because of the following reasons. When Nmax is below the lower limit of the condition (4), if an attempt is made to obtain an equivalent optical power for maintaining the compactness, then the radii of curvatures of the lenses must be smaller, thus resulting in large aberrations and also making the lens fabrication difficult. Further, if an attempt is made to avoid them, then the size of the variable magnification system must be increased. The condition (2) is based on the same grounds as the above.

Further, it is desirable that the lens having a largest refractive index is the positive meniscus lens which is convex at the object side thereof in the first lens group (Gr1). This is because such a configuration enables suppressing the increase of the Petzval sum, thus enabling successful corrections of field curvatures and the astigmatisms.

In a variable magnification optical system including a first lens group (Gr1) having a negative optical power and a second lens group (Gr2) having a positive optical power, wherein the spacing between the first lens group (Gr1) and the second lens group (Gr2) is decreased for magnification from the wide-angle end to the telephoto end, and there is provided at least one aspherical surface, it is desirable that the following conditions (2) and (5) are satisfied.

$$Nasp \geq 1.85 \tag{5}$$

$$0.7 < f2/fw < 2 \tag{2}$$

Nasp: the refractive index of a lens having a largest refractive index, out of the lenses having an aspherical surface.

This is because the use of aspherical lenses having high refractive indexes enables corrections of respective aberrations which are caused when the optical power is increased in association with enhanced compactness. The condition (2) is based on the same grounds as the above.

When Nasp is below the lower limit in the condition (5), the Petzval sum is increased, thus increasing the difficulty of corrections of field curvatures and astigmatisms.

Further, it is desirable that the refractive index Nasp satisfies the following condition (5').

$$Nasp \geq 1.9 \tag{5'}$$

If Nasp is below the lower limit of the condition (5'), then the local curvatures (the partial curvature) of the aspherical surfaces is large, thus increasing the difficulty of fabrication.

In the case where the variable magnification optical system includes at least one aspherical surface, it is desirable that the positive meniscus lens which is convex at the object side thereof in the first lens group (Gr1) has at least one aspherical surface. This is because such a configuration enables successful corrections of field curvatures, astigmatisms and distortion aberrations.

Further, in the case where the first lens group (Gr1) in the variable magnification optical system includes at least one negative lens and at least one positive lens, it is desirable that the following condition (6) is satisfied.

$$\Delta v1max > 25 \tag{6}$$

Δv1max: the maximum value out of the absolute values of the Abbe number differences between positive and negative lenses out of the lenses of the first lens group (Gr1).

This is because if Δν1max is below the lower limit of the condition (6), then the correction of chromatic aberrations of magnification becomes insufficient, which may cause degradation of the contrast around images.

In the variable magnification optical system, it is desirable that the refractive index of the positive lens included in the first lens group (Gr1) is equal to or greater than 1.85. This is because such a configuration can minimize the increase of the Petzval sum, thus enabling successful corrections of field curvatures and astigmatisms. Such a configuration further enables using only a single positive lens, thereby reducing the load on the lens driving system. Particularly, since the lenses of the first lens group (Gr1) have large lens diameters and large weights, such a configuration can provide significant effects.

Further, it is desirable that the following condition (7) is satisfied in this case.

$$1 < |f1p/f1| < 3 \qquad (7)$$

f1p: the focal length of the positive lens in the first lens group (Gr1).

f1: the total focal length of the first lens group (Gr1).

This is because if the upper limit of the condition (7) is exceeded, then the Petzval sum will be increased, thus resulting in insufficient corrections of field curvatures and astigmatisms. Further, when the value is below the lower limit of the condition (7), the negative optical power of the entire first lens group (Gr1) is decreased, thus increasing the difficulty of ensuring the back focus.

Further, in the variable magnification optical system, it is desirable that the first lens group (Gr1) satisfies the following conditions (8), (9).

$$1 < |f1/fw| < 4 \qquad (8)$$

$$0.3 < |f1/ft| < 2 \qquad (9)$$

ft: the total focal length of the entire optical system at the telephoto end.

This is because if the upper limits of the conditions (8) and (9) are exceeded, this results in insufficient corrections of astigmatisms and distortion aberrations, particularly at the wide-angle end. Further, if the values are below the lower limits of the conditions (8) and (9), the respective lenses constituting the first lens group (Gr1) are required to have significantly large optical powers, which increases the difficulty of fabrication and also makes it impossible to correct induced chromatic aberrations of magnification.

Further, it is desirable that the total focal length f1 of the first lens group (Gr1) and the total focal length ft of the entire optical system at the telephoto end satisfy the following conditions (8') and (9').

$$1.5 < |f1/fw| < 3.5 \qquad (8')$$

$$0.5 < |f1/ft| < 1.3 \qquad (9')$$

This is because if the upper limits of the conditions (8') and (9') are exceeded, this will decreases the negative optical power of the first lens group (Gr1) and involves an increase of the diameter of the front lens. If the values are below the lower limits of the conditions (8') and (9'), this will increase the error sensitivity of the first lens group (Gr1) at the telephoto end, thus necessitating an operation for performing adjustment among the lenses.

It is desirable that the first lens group (Gr1) is constituted by two lenses which are a negative lens and a positive lens placed in this order from the object side. Placing a negative lens and a positive lens in this order enables easily ensuring the back focus at the wide angle end and also enables successfully correcting chromatic aberrations of magnification and aberrations of off-axis light at a wide angle of view.

In this case, it is desirable that the following condition (10) is satisfied.

$$0.2 < |f1n/f1p| < 0.7 \qquad (10)$$

f1n: the focal length of the negative lens in the first lens group (Gr1).

This is because if the upper limit of the condition (10) is exceeded, this will result in insufficient corrections of astigmatisms and distortion aberrations. If the value is below the lower limit of the condition (10), the respective lenses constituting the first lens group (Gr1) are required to have significantly large optical powers, thus increasing the difficulty of fabrication of the lenses. It is desirable that the first lens group (Gr1) is constituted by only cemented lenses.

If the compactness in the optical axis direction is enhanced, this will increase the decentration error sensitivity of the first lens group (Gr1), thus necessitating adjustment among the lenses in the first lens group (Gr1). However, by constituting the first lens group (Gr1) by cemented lenses, it is possible to largely reduce the decentration error sensitivity of the lens surfaces in the first lens group (Gr1), and even if there is a need for adjustment of the spacing of lenses, it is possible to keep a good sensitivity balance.

Furthermore, such a configuration enables simplifying the structure of the lens-barrel, not shown, which supports the first lens group (Gr1), and, as a result, it is possible to efficiently utilize space thus enabling further enhancing the compactness, while previously the space had to be extended due to mechanical constraints even though it is optically unfavorable. Further, bonding lenses to one another can suppress the occurrence of undesired light which is reflected between opposing lenses.

Further, in this case, it is desirable that the negative lens in the first lens group (Gr1) is concave-shaped at the both sides thereof and also the following condition (6') is satisfied in addition to the condition defined by the condition (6).

$$\Delta\nu 1max < 35 \qquad (6')$$

This is based on the following reasons. In the case where the first lens group (Gr1) is constituted by cemented lenses, the substantial optical powers of the respective lenses becomes small, and therefore it is desirable that the negative lens in the first lens group (Gr1) is concave-shaped at the both sides thereof in order to provide a desired negative optical power. Further, if Δν1max is below the lower limit of the condition (6') in the case of using cemented lenses, this will result in insufficient corrections of chromatic aberration of magnification.

Further, in the case of constituting the first lens group (Gr1) by only cemented lenses, it is desirable that the third lens group (Gr3) is constituted by a single positive lens and the following condition (11) is satisfied.

$$N3p > 1.75 \qquad (11)$$

This is because if N3p is below the lower limit in the condition (11), the movement of the third lens group (Gr3) is increased during magnification, thus involving an increase of the total optical length.

It is desirable that the second lens group (Gr2) includes at least one aspherical surface. This enables successful correction of spherical aberrations. Further, it is desirable that the second lens group (Gr2) includes at least one positive lens and at least one negative lens. This enables corrections of spherical aberrations and axial chromatic aberrations.

It is desirable that the second lens group (Gr2) satisfies the following condition (12).

$$0.3 < f2/ft < 0.9 \quad (12)$$

This is based on the following reasons. When the upper limit of the condition (12) is exceeded, the optical power of the second lens group (Gr2) is too small, thereby increasing the difficulty of providing magnification ratios of about two or three. Also, when the value is below the lower limit of the condition (2), the decentration error sensitivity of the second lens group (Gr2) is significantly high, thus increasing the difficulty of fabrication of the lenses.

Further, it is desirable that the total focal length f2 of the second lens group (Gr2) and the total focal length ft of the entire optical system at the telephoto end satisfy the following condition (12').

$$0.4 < f2/ft < 0.8 \quad (12')$$

This is because when the upper limit is exceeded in the condition (12'), the optical power of the second lens group (Gr2) is small, and therefore the movement of the second lens group (Gr2) is increased during magnification, thus involving an increase of the total optical length. When the value is below the lower limit of the condition (12'), the decentration error sensitivity of the second lens group (Gr2) is high, thus necessitating an operation for adjustment among the lenses.

It is desirable that the second lens group (Gr2) satisfies the following condition (13).

$$\Delta v2max > 10 \quad (13)$$

$\Delta v2max$: the maximum value out of the absolute values of the Abbe number differences between positive and negative lenses out of the lenses of the second lens group (Gr2).

This is because if $\Delta v2max$ is below the lower limit of the condition (13), then the correction of axial chromatic aberrations becomes insufficient, which may cause degradation of the axial contrast around images.

It is desirable that the second lens group (Gr2) is constituted by two lenses which are a positive lens and a negative lens placed in order from the object side. By placing them in such an order, the position of the principal point of the second lens group (Gr2) approaches the first lens group (Gr1), thus enabling reduction of the substantial optical power of the second lens group (Gr2) and enabling reduction of the decentration error sensitivity thereof, while maintaining the effect of magnification.

In this case, it is desirable that the following conditions (14) and (15) are satisfied.

$$0.9 < |f2n/f2p| < 1.8 \quad (14)$$

$$N2p > 1.75 \quad (15)$$

f2p: the focal length of the positive lens in the second lens group (Gr2).

f2n: the focal length of the negative lens in the second lens group (Gr2).

N2p: the refractive index of the positive lens in the second lens group (Gr2).

This is because if the upper limit of the condition (14) is exceeded, this results in insufficient corrections of spherical aberrations, while if the value is below the lower limit of the condition (14), then the optical powers of the respective lenses in the second lens group (Gr2) will be large, thereby increasing the decentration error sensitivity and degrading the productivity of the lenses. Further, if N2p is below the lower limit of the condition (15), the radius of curvature of the positive lens in the second lens group (Gr2) must be decreased in order to provide a required optical power for magnification, thus increasing the difficulty of fabrication of the lenses.

It is desirable that the second lens group (Gr2) and the third lens group (Gr3) satisfy the following condition (16).

$$0.4 < f2/f3 < 1 \quad (16)$$

f3: the total focal length of the third lens group (Gr3).

This is because if the upper limit is exceeded in the condition (16), then the optical power of the second lens group (Gr2) will be small, thus increasing the movement of the second lens group (Gr2) and if the value is below the lower limit of the condition (16), then the optical power of the third lens group (Gr3) will be small thus increasing the movement of the third lens group (Gr3). As a result of both the cases, the total optical length is increased.

In the variable magnification optical system, it is desirable that the incident angle $\alpha w$ of the principal ray, out of light incident to the image pickup surface, at the effective image circle diameter satisfies the following condition (17).

$$\alpha w > 0 \quad (17)$$

$\alpha w$: the angle (deg) of the principal ray with respect to a vertical line upstanding on the image surface, at the wide-angle end.

Figure 8:
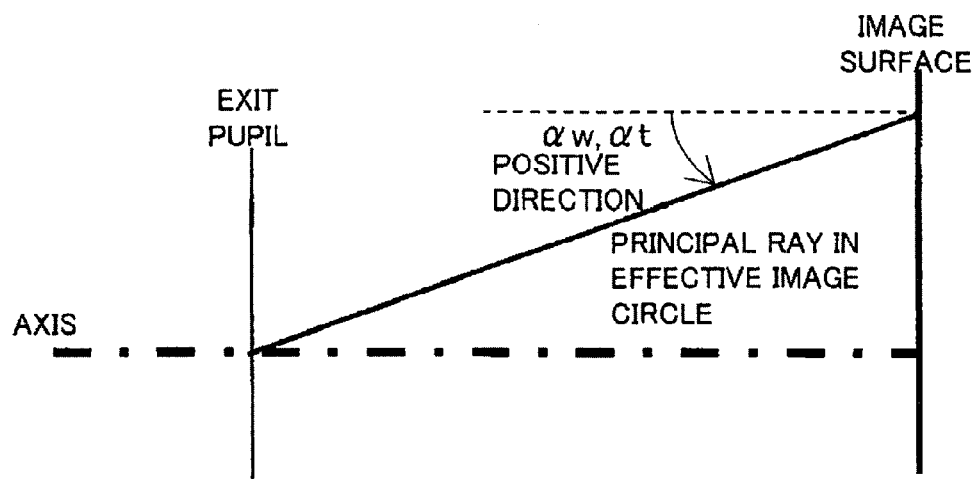
FIG. 8 is a schematic diagram illustrating the definition of the incident angle of the principal ray at the image surface.

Here, the incident angle at the image surface is defined in such a manner that the direction illustrated in FIG. 8 is the positive direction. Namely, the left side in FIG. 8 is the object side and the right side is the image surface side. The $\alpha w$ is the angle of the principal ray extending from the exit pupil position at the effective image circle diameter, which is measured in the counterclockwise direction from the vertical line upstanding on the image surface.

By satisfying the condition (17), it is possible to ensure a wide angle of view and enhance the compactness.

In the variable magnification optical system, it is desirable that the incident angle $\alpha w$ of the principal ray out of light incident to the image pickup surface at the effective image circle diameter satisfies the following condition (18).

$$|\alpha w - \alpha t| < 30 \quad (18)$$

$\alpha t$: the angle (deg) of the principal ray at the effective image circle diameter, with respect to the vertical line upstanding on the image surface, at the telephoto end.

This is because if the upper limit of the condition (18) is exceeded, this will make it difficult to suppress degradation of the peripheral illumination even if the lens array is placed in front of the image pickup surface. Further, as illustrated in FIG. 8, similarly to $\alpha w$, $\alpha t$ is defined in such a manner that a vertical line upstanding on the image surface is the reference and the counterclockwise direction is the positive direction.

Further, it is preferable that the variable magnification optical system satisfies the following condition (19).

$$0.1 < Y'/TL < 0.5 \quad (19)$$

Y': the effective image circle radius

TL: the maximum length along the optical axis between the peak of the surface which is most proximal to the object and the image surface over the entire magnification range.

This is because if the upper limit of the condition (19) is exceeded, then the movement of the second lens group (Gr2) for magnification will be small and the optical power thereof will be excessively large, thus making it difficult to satisfy fabrication requirements such as the required radii of curvatures of the respective lenses of the second lens group (Gr2). Further, if the value of Y'/TL is below the lower limit of the condition (19), this will make it difficult to mount the variable magnification optical system onto a portable terminal, etc., in view of the size of the variable magnification optical system.

Further, it is preferable that the variable magnification optical system satisfies the following condition (19').

$$0.13 < Y'/TL < 0.3 \qquad (19')$$

This is because when the upper limit of the condition (19') is exceeded, the optical power of the second lens group (Gr2) is large, thereby involving an increase of the decentration error sensitivity of the second lens group (Gr2). Further, if the value of Y'/TL is below the lower limit of the condition (19'), this will increase the size of the variable magnification optical system and also increase the load on the driving system in association with the increased movement for magnification, which involves an increase of the size of the driving system.

Further, it is preferable that the variable magnification optical system satisfies the following condition (20).

$$0.15 < fw/Tw < 0.4 \qquad (20)$$

Tw: the maximum length along the optical axis between the peak of the surface which is most proximal to the object and the image surface, at the wide angle end This is because if the upper limit of the condition (20) is exceeded, this will increase the difficulty of ensuring the optical performance due to insufficient corrections of astigmatisms, etc., while if the value is below the lower limit of the condition (20), this will make it difficult to mount the system onto a portable terminal, etc., in view of the size.

Further, it is preferable that the variable magnification optical system satisfies the following condition (21).

$$0.4 < ft/Tt < 1 \qquad (21)$$

Tt: the maximum length along the optical axis between the peak of the surface which is most proximal to the object and the image surface, at the telephoto end.

This is because if the upper limit of the condition (21) is exceeded, the movement of the second lens group (Gr2) will be too small, thus making it difficult to provide magnification ratios of two or three, while if the value is below the lower limit of the condition (21), this will increase the difficulty of mounting it onto a portable terminal, etc., in view of the size of the variable magnification optical system.

It is desirable that, in the variable magnification optical system, focusing is performed by moving the second lens group (Gr2) or a single or plural lens groups which are closer to the image than the second lens group (Gr2). This is because focusing with the first lens group (Gr1) is unfavorable in view of the total optical length. Furthermore, focusing with the first lens group (Gr1) will involve an increase of the front lens diameter in order to ensure the peripheral light quantity and thus is unfavorable.

Two or more lenses, in the variable magnification optical system, may be made of resin (plastic) material. Plural plastic lenses can be formed at once and also dies for plastic lenses have long lives, and therefore utilization of plastic lenses is advantageous in view of cost and productivity.

Further, it is desirable that the negative lens in the first lens group (Gr1) and the positive lens the third lens group (Gr3) are made from resin (plastic) material. This can alleviate fluctuations of the back focus caused by variations of the ambient temperature.

Further, it is desirable that all the lens groups in the variable magnification optical system are constituted by single lenses or cemented lenses. This enables drastically simplifying the configuration of the mirror-barrel, thereby reducing the cost. Further, the simplified configuration of the mirror-barrel enables efficient utilization of space thus further enhancing the compactness of the variable magnification optical system, while previously the space had to be extended due to mechanical constraints even though it is optically unfavorable. Further, the use of cemented lenses can suppress the occurrence of undesired light which is reflected between opposing lenses.

Further, it is desirable that all the lens surfaces which face to air, in the variable magnification optical system, are aspherical surfaces. This can enhance both the compactness and the image quality.

Further, it is desirable that the variable magnification optical system is constituted by a first lens group (Gr1) consisting of a negative lens and a positive meniscus lens which is convex at the object side thereof, a second lens group (Gr2) consisting of a bi-convex lens and a negative lens, and a third lens group (Gr3) consisting of a positive lens, which are placed in this order from the object side. This negative-to-positive order of the first lens group (Gr1) is employed in order to enable ensuring the back focus at the wide-angle end and correcting axial chromatic aberrations of light rays with wide angles of view. The positive meniscus lens which is convex at the object side thereof is placed since it enables successful correction of astigmatisms. The positive-to-negative order of the second lens group (Gr2) is employed in order to bring the position of the principal point of the second lens group (Gr2) close to the first lens group (Gr1) to decrease the substantial optical power of the second lens group (Gr2) thus reducing the decentration error sensitivity, while maintaining the effect of magnification. The bi-convex lens is placed in order to increase the power of the second lens group (Gr2) to reduce the movement thereof during magnification. Further, in the respective embodiments except the sixth embodiment, since the third lens group (Gr3) having a positive optical power is provided at the image surface side of the second lens group (Gr2), the required movement of the second lens group (Gr2) can be reduced in comparison with the case where only the first lens group (Gr1) and the second lens group (Gr2) are provided, and also the incident angles of off-axis light rays at the light-receptive surface of the image pickup device can be made closer to those of a telecentric system by the third lens group (Gr3).

In the respective embodiments, since the first lens group (Gr1) includes at least one aspherical surface, it is possible to successfully correct astigmatisms and distortion aberrations. Further, in the third and fourth embodiments, since the fourth lens group (Gr4) having a negative optical power is further provided, it is possible to drastically improve the optical performance for proximal objects and also bring the position of exit pupil closer to the object side than the image pickup plane at the telephoto end, thus resulting in reduction of the difference in the incident angles of light rays to the image pickup surface between the wide angle end and the telephoto end.

When in a variable magnification optical system including a third lens group (Gr3), the third lens group (Gr3) is constituted by a single or two lenses and focusing is performed by moving the third lens group (Gr3) towards the object, it is possible to provide clear images even for proximal objects without involving an increase of the front lens diameter for focusing. Further, the third lens group (Gr3) mainly has the function of aiding magnification and the function of adjusting the incident angle to the image pickup device. Since the main functions of the third lens group (Gr3) are aiding magnification and adjusting the incident angle of light to the image pickup device and thus a smaller load is imposed thereon in comparison with the other lens groups, the third lens group (Gr3) is constituted by a single or two lenses since a single or two lenses are sufficient to constitute the third lens group (Gr3).

In a variable magnification optical system including three or more lens groups, it is desirable that three or more lens groups are movable in the optical axis direction, because it is difficult to ensure the magnification ratio only by the movement of two lens groups since there are limitations on the movement of the second lens group (Gr2).

Next, with reference to the drawings, there will be described an exemplary concrete embodiment of the image taking lens device incorporating a variable magnification optical system according to the present invention.

Figure 9:
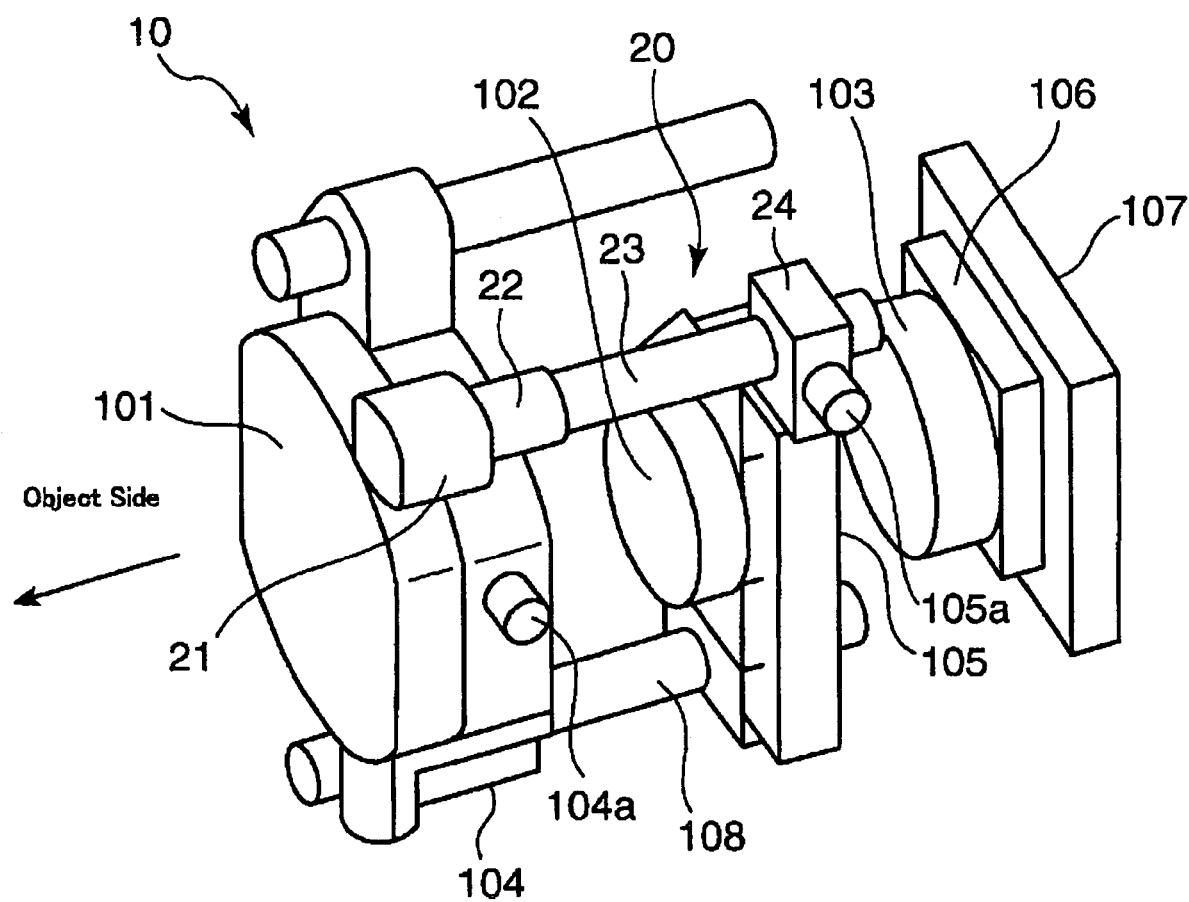
FIG. 9 is a perspective view illustrating an exemplary internal structure of an image taking lens device including a variable magnification optical system and an image taking device according to the present invention.
Figure 10A:
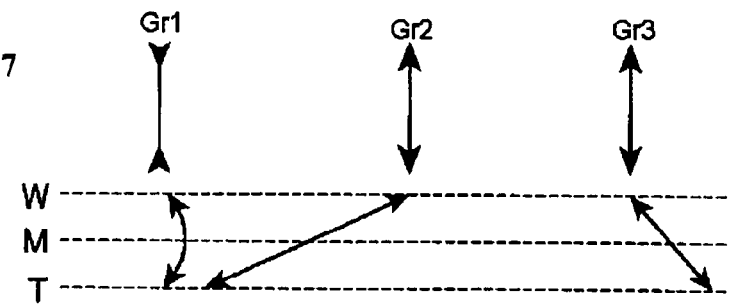
FIG. 10(A) is a schematic view illustrating the way of moving the lens groups in the variable magnification optical systems according to the first, fourth and seventh embodiments.
Figure 10B:
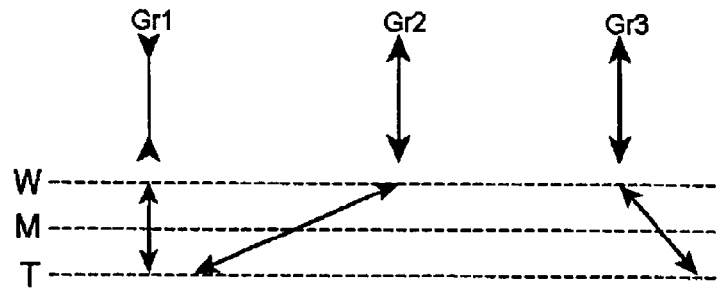
FIG. 10(B) is a schematic view illustrating the way of moving the lens groups in the variable magnification optical system according to the second embodiment.
Figure 10C:
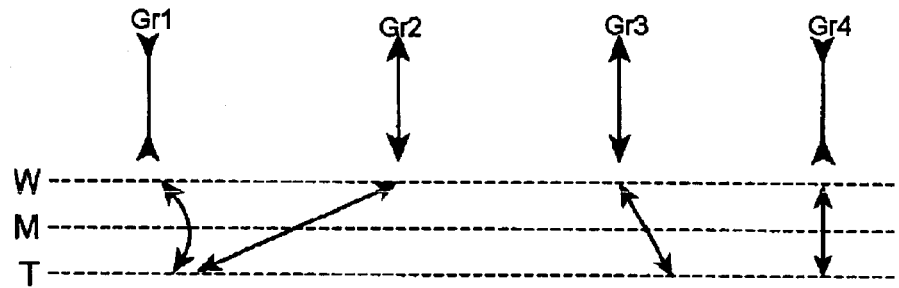
FIG. 10(C) is a schematic view illustrating the way of moving the lens groups in the variable magnification optical system according to the third embodiment.
Figure 10D:
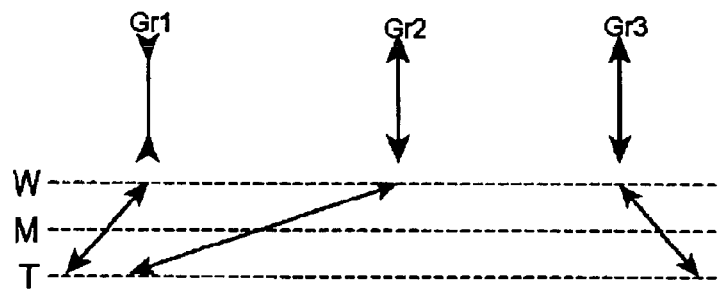
FIG. 10(D) is a schematic view illustrating the way of moving the lens groups in the variable magnification optical system according to the fifth embodiment.
Figure 10E:
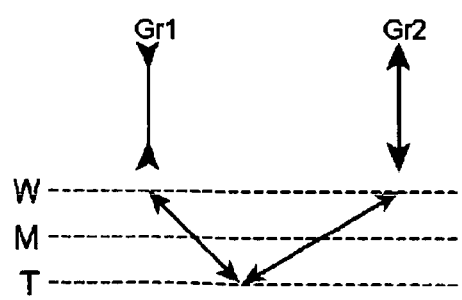
FIG. 10(E) is a schematic view illustrating the way of moving the lens groups in the variable magnification optical system according to the seventh embodiment.
Figure 14A:
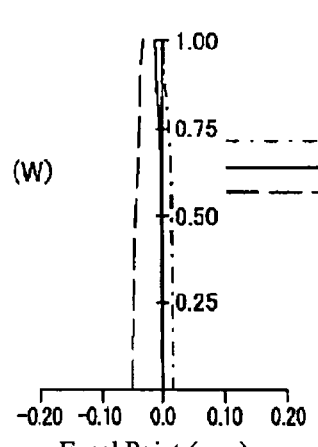
FIGS. 14(A) to 14(I) are views of aberrations illustrating the spherical aberration, the astigmatism and the distortion aberrations of the lens groups in the variable magnification optical system according to the fourth embodiment.
Figure 14B:
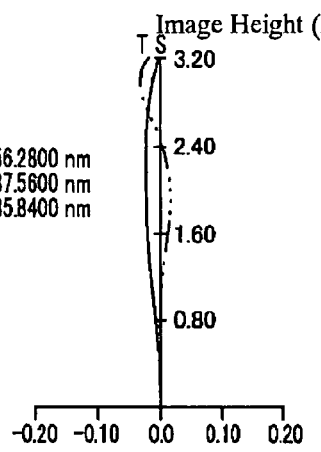
Figure 14C:
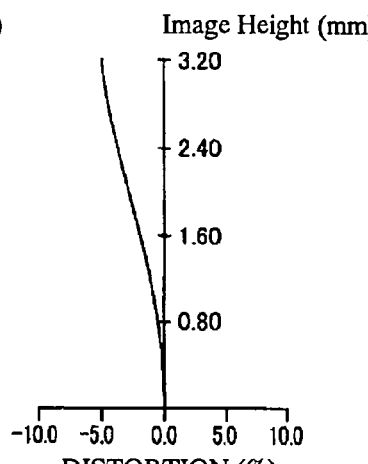
Figure 14D:
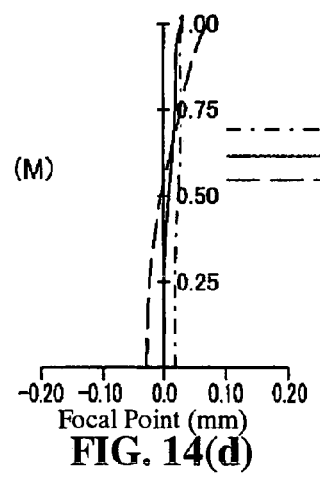
Figure 14E:
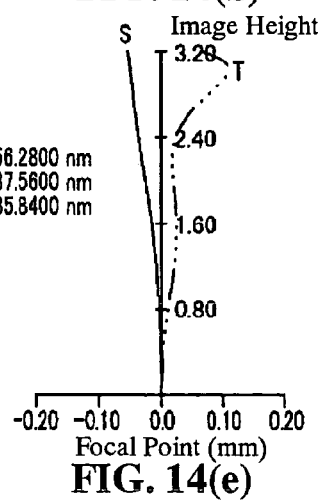
Figure 14F:
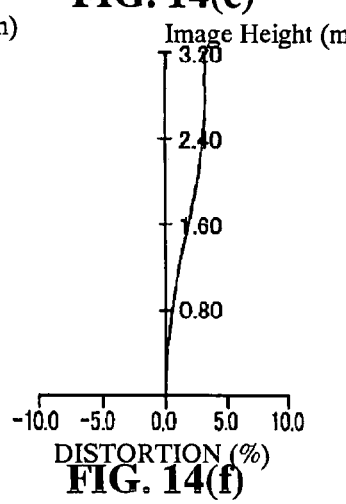
Figure 14G:
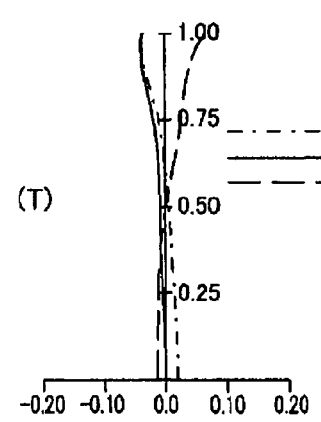
Figure 14H:
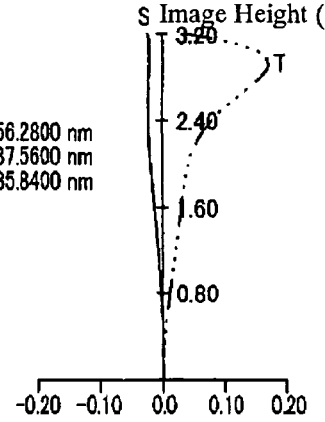
Figure 14I:
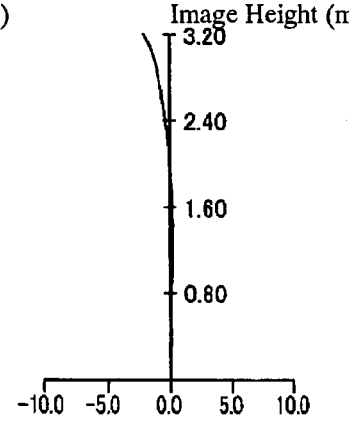
Figure 16A:
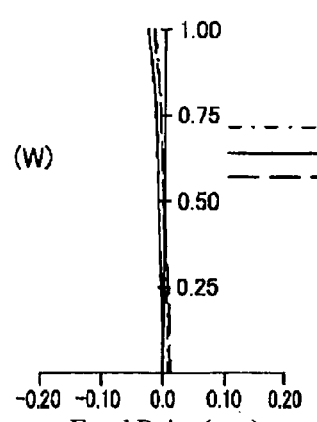
FIGS. 16(A) to 16(I) are views of aberrations illustrating the spherical aberration, the astigmatism and the distortion aberrations of the lens groups in the variable magnification optical system according to the sixth embodiment.
Figure 16B:
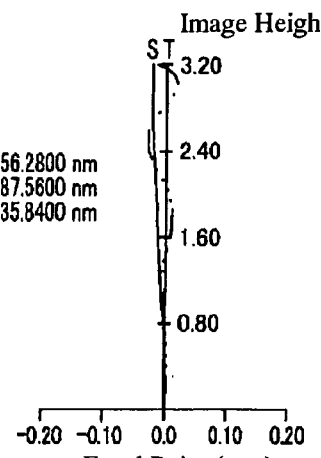
Figure 16C:
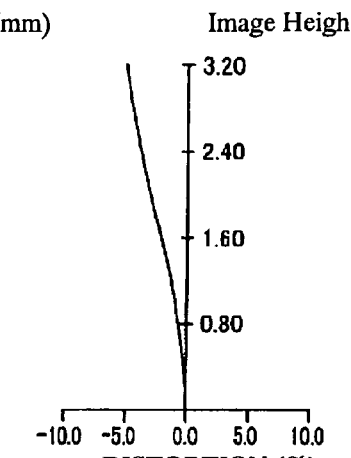
Figure 16D:
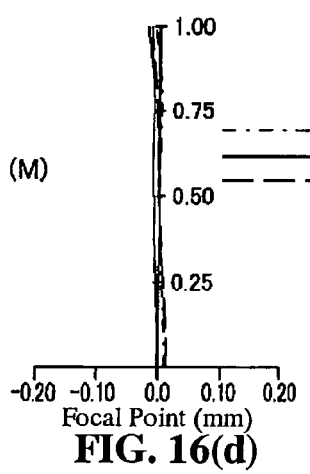
Figure 16E:
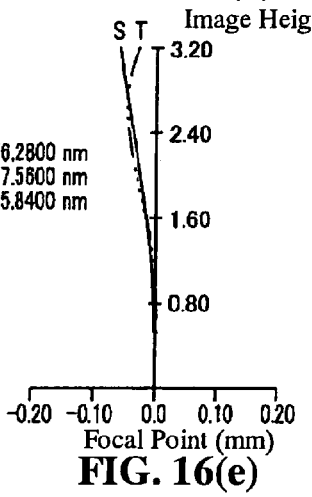
Figure 16F:
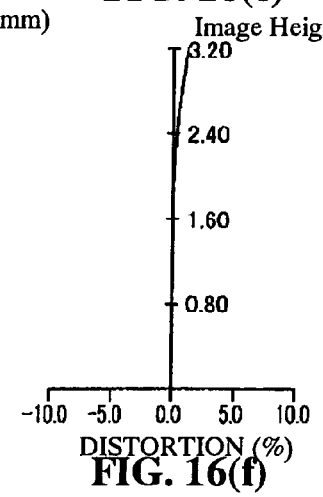
Figure 16G:
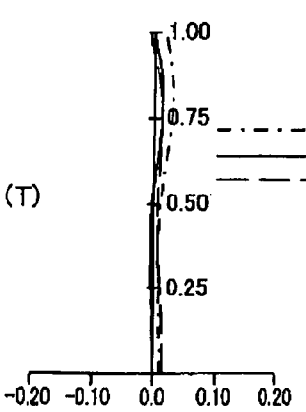
Figure 16H:
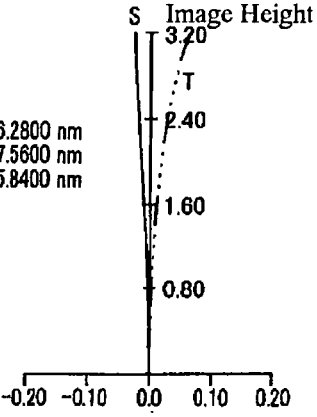
Figure 16I:
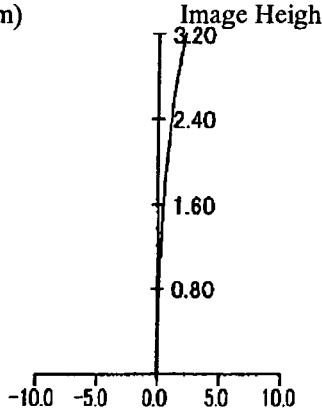

FIG. 9 is a perspective view illustrating an example of the internal structure of an image taking lens device 10. There is illustrated, in the figure, the image taking lens device including the lens groups constituting a variable magnification optical system and a driving device for the lens groups, wherein an image pickup device, not shown, is included therein. In this example, the variable magnification optical system is constituted by three lens groups. Further, it is assumed that the first lens group 101 and the second lens group 102 are moved for magnification and focusing while the position of the third lens group 103 is fixed.

As illustrated in the figure, the image taking lens device 10 is configured such that the first lens group 101, the second lens group 102 and the third lens group 103 are arranged from the object (subject) side, with the respective light axes coincident with one another. The first to third lens groups 101 to 103 are supported by supporting members 104 to 106, respectively. A parallel plane plate and the image pickup device, not shown, are supported by a fixing member 107 and secured to the center portion of the fixing member 107. The third lens group 103 and the supporting member 106 are secured to the fixing member 107 which supports the image pickup device and the fixing member 107 is provided on and secured to a portable phone main body, not shown. A bar-shaped guide member 108 is penetrated through the supporting members 104, 105 for the first and second lens groups, and engaging portions 104a, 105a are provided at proper portions of the supporting members 104, 105.

A driving unit 20 constituted by an impact-type actuator, for example, is mounted to the supporting member 105 which supports the second lens group 102, and the second lens group 102 is driven in the optical axis direction by the driving device including the driving unit 20 through the supporting member 105. More specifically, the driving unit 20 is constituted by a supporting member 1, a piezoelectric device 22, a driving member 23 and an engaging member 24. The supporting member 21 is secured to the portable phone main body, not shown, and supports the piezoelectric device 22 and the driving member 23. The piezoelectric device 22 is set such that the direction of expansion thereof, which is the direction of polarization, is coincident with the axial direction of the supporting member 21. The driving member 23 is secured to the piezoelectric device 22 at one end thereof and is secured to a side surface of the engaging member 24 at the other end.

In the configuration, when a voltage is applied to the piezoelectric device 22 by the driving means, not shown, the piezoelectric device 22 expands or contracts in the optical axis direction depending on the direction of the voltage. Then, the expansion or contraction is transferred to the engaging member 24 which is coupled thereto through the driving member 23. Since the engaging member 24 is coupled to the supporting member 105 for the second lens group, the first lens group 101 and the second lens group 102 can be moved through the engaging member 24. The engaging portions 104a, 105a for the first and second lens groups 101, 102 can be engaged with cam members, not shown, to generate desired movements of the lens groups required for magnification and focusing, etc. Further, an engaging portion similar to the engaging portions 104a, 105a for the first and second lens groups can be provided on the supporting member 106 for the third lens group to enable driving the three lens groups concurrently for magnification or focusing. Further, four or more lens groups can be provided with a similar configuration and the respective lens groups can be driven individually or in correlation with one another for magnification or focusing.

In the image taking lens device as described above, an incident light ray from the object passes through the first, second and third lens groups 101 to 103 in order. Then, it passes through the parallel plane plate, not shown, which is placed adjacent to the third lens group 103. At this time, the optical image is corrected to minimize folded-back noise, which is induced when optical images are converted into electrical signals by the image pickup device. The parallel plane plate corresponds to an optical low pass filter, an infrared cut filter, or a cover glass for the image pickup device, etc. Finally, an optical image of the object is created on the light-receptive surface of the image pickup device, not shown, and then the optical image is converted into electrical signals. The electrical signals are subjected to predetermined digital image processing and image compression processing, etc., when required and then are stored in a memory of a portable phone or portable information terminal as digital image signals or transmitted to other digital apparatus in a wire manner or a wire-less manner.

Further, a stepping motor may be employed for driving the respective lens groups and the optical stop (ST). Also, in the case where smaller movements are required or the respective lens groups are lightweight, microminiaturized piezoelectric actuators may be individually utilized for the respective lens groups. This enables individually driving the respective lens groups and enhancing the compactness of the image taking lens device while suppressing increases of the volume and the electric power consumption of the driving portion.

Hereinafter, examples of the variable magnification optical system according to the present invention will be further concretely described, by exemplifying construction data, diagrams of aberration diagrams, etc.

Table 1 represents the construction data for the respective lenses according to the first embodiment (first example).

TABLE 1

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | −16.695 | 0.800 | | | 1.53048 | 55.72 |
| r2* | 5.030 | 0.877 | | | | |
| r3 | 6.374 | 1.621 | | | 1.99378 | 28.04 |
| r4 | 9.359 | 8.461 | 3.174 | 1.400 | | |
| r5 | ∞ | 0.100 | | | | |
| r6* | 3.231 | 1.318 | | | 1.83864 | 41.02 |
| r7 | −5.926 | 1.114 | | | 1.71520 | 25.80 |
| r8* | 3.201 | 1.400 | 6.530 | 9.714 | | |
| r9* | 13.051 | 2.057 | | | 1.53048 | 55.72 |
| r10* | −5.547 | 2.253 | 1.505 | 1.000 | | |
| r11 | ∞ | 0.500 | | | 1.51680 | 64.20 |
| r12 | ∞ | 0.500 | | | | |
| r13 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | 7.21E−04 | −1.07E−05 | 6.65E−09 | 2.11E−09 |
| r2 | 0 | −1.54E−04 | 3.26E−05 | −2.46E−06 | 2.14E−08 |
| r6 | 0 | −3.56E−04 | −4.71E−04 | 3.54E−04 | −1.21E−04 |
| r8 | 0 | 1.06E−02 | 1.03E−03 | 4.26E−04 | −9.35E−05 |
| r9 | 0 | 2.45E−04 | 5.20E−05 | −4.01E−07 | 5.04E−08 |
| r10 | 0 | 4.80E−03 | −3.42E−04 | 2.97E−05 | −8.57E−07 |

There are represented, in order from left to right in the table, respective lens-surface numbers, the radii of curvatures of the respective surfaces (with a unit of mm), the spacing of the respective lens surfaces along the optical axis (the axial distance, with a unit of mm), at the wide-angle ends (W), the middle points (M) and the telephoto ends (T), the refractive indexes m and the Abbe numbers of the respective lenses. The blanks of the axial distance M and T represent the same values as those entered in the W-boxes at the left side thereof. The lens-surface number ri (i=1, 2, 3, . . . ) indicates the i-th lens surface which is countered from the object-side, and a surface designated as ri* is an aspherical surface, as shown in FIG. 1. Further, for example, "E-05" means $10^{-5}$ as an aspherical coefficient.

Further, the optical stop (ST), the both surfaces of the parallel plane plate (PL), the light-receptive surface of the image pickup device (SR) are flat planes and their radii of curvatures are ∞.

The aspherical shapes of the lenses are defined by the following equation 1 using a local rectangular coordinate system (x, y, z), wherein its origin is the peak of the surface, and the direction from the object to the image pickup device is the positive direction of z axis.

$$Z = \frac{ch^2}{1+\sqrt{1-(1-k)c^2h^2}} + Ah^4 + Bh^6 + Ch^8 + Dh^{10}$$

z: displacement at a height of h in the z-axis direction (with respect to the peak of the surface as a reference), h: the height perpendicular to the z axis ($h^2=x^2+y^2$), c: the paraxial curvature (1/the radius of curvature), A, B, C, D: the quartic, sextic, octic, and dectic aspherical coefficients, k: conical coefficient As can be seen from the equation 1, the radii of curvatures of the aspherical lenses represented in Table 1 represent values near the centers of the lenses.

FIG. 11 represents, in order from left to right, the spherical aberration, the astigmatism and the distortion of the entire optical system according to the present first example having the lens placement and configuration. In this figure, the respective aberrations at the wide-angle end (W), the middle point (M) and the telephoto end (T) are presented at the upper stage, the middle stage and the lower stage, respectively. The horizontal axes for the spherical aberration and the astigmatism represent the deviation of the focal point with a unit of mm, while the horizontal axis for the distortion aberration represents the distortion with respect to the entirety with a unit of %. The vertical axis for the spherical aberration represents values standardized with the incident height, while the vertical axes for the astigmatism and the distortion aberration represent values of image heights (a unit of mm). Further, in the figures of the spherical aberration, there are represented aberrations for three lights with different wavelengths, wherein the broken line indicates a red color (with a wavelength of 656.28 nm), the solid line indicates a yellow color (with a so-called d-line; with a wavelength of 587.56 nm) and the two-dot chain line indicates a blue color (with a wavelength of 435.84 nm). Further, in the figures of the astigmatisms, the reference characters S and T indicate the results from sagittal (radial) surfaces and tangential (Meridional) surfaces, respectively. Further, the figures of the astigmatisms and the distortion aberrations represent the results obtained by using the yellow lines (d-line).

As can be seen from FIG. 11, the lens groups according to the present first example exhibit chromatic aberrations and astigmatisms at the wide angle end (W), the middle point (M) and the telephoto end (T) within about 0.1 mm and distortion aberrations within about 5%, which are excellent optical characteristics. Further, Table 8 and Table 9 represent the focal lengths (with a unit of mm) and the F values at the wide angle end (W), the middle point (M) and the telephoto end (T), according to the first example. These tables reveal that the present invention can realize short-focus optical systems with excellent brightness.

Tables 2 to 7 represent the construction data for the respective lenses in the second embodiment (second example), the third embodiment (the third example), the fourth embodiment (the fourth example), the fifth embodiment (the fifth example), the sixth embodiment (the sixth example) and the seventh embodiment (the seventh example).

TABLE 2

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | −53.091 | 0.500 | | | 1.48740 | 70.44 |
| r2 | 4.282 | 0.776 | | | 2.00330 | 28.30 |
| r3* | 4.967 | 3.472 | 1.629 | 0.500 | | |
| r4 | ∞ | 0.100 | | | | |
| r5* | 3.011 | 1.341 | | | 1.84003 | 40.90 |
| r6 | −2.614 | 0.957 | | | 1.69718 | 26.74 |
| r7* | 3.261 | 1.216 | 4.065 | 5.964 | | |
| r8* | −19.420 | 0.862 | | | 2.00330 | 28.30 |
| r9* | −6.076 | 2.275 | 1.270 | 0.500 | | |
| r10 | ∞ | 0.500 | | | 1.51680 | 64.20 |
| r11 | ∞ | 0.500 | | | | |
| r12 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | −2.85E−03 | 2.67E−04 | −6.27E−06 | −2.23E−07 |
| r3 | 0 | −2.69E−03 | 3.03E−04 | −1.34E−08 | −1.94E−06 |
| r5 | 0 | −2.84E−03 | −8.34E−04 | 2.27E−04 | −8.24E−05 |
| r7 | 0 | 1.47E−02 | 2.08E−04 | 8.80E−04 | −1.40E−04 |
| r8 | 0 | 3.14E−03 | −5.37E−04 | 1.46E−05 | 1.28E−06 |
| r9 | 0 | 4.11E−03 | −1.76E−04 | −4.59E−05 | 3.77E−06 |

TABLE 3

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | −8.224 | 0.709 | | | 1.55846 | 56.94 |
| r2 | 8.180 | 0.945 | | | 1.92286 | 20.88 |
| r3* | 13.738 | 6.592 | 2.063 | 0.500 | | |
| r4 | ∞ | 0.186 | | | | |
| r5* | 2.700 | 1.654 | | | 1.76134 | 50.41 |
| r6 | −13.138 | 1.079 | | | 1.78847 | 24.83 |
| r7* | 4.113 | 1.064 | 4.926 | 7.408 | | |
| r8* | −107.035 | 1.426 | | | 1.75661 | 51.20 |
| r9 | −5.106 | 1.331 | 0.772 | 0.501 | | |
| r10* | −3.084 | 0.700 | | | 1.50105 | 68.52 |
| r11* | −3.547 | 0.515 | | | | |
| r12 | ∞ | 0.300 | | | 1.51680 | 64.20 |
| r13 | ∞ | 0.500 | | | | |
| r14 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | 5.85E−04 | 6.54E−05 | 3.70E−06 | −3.52E−07 |
| r3 | 0 | 2.07E−04 | −1.40E−04 | 5.19E−05 | −3.51E−06 |
| r5 | 0 | −3.13E−05 | −7.76E−04 | 6.46E−04 | −2.06E−04 |
| r7 | 0 | 2.08E−02 | 3.34E−04 | 3.63E−03 | −7.37E−04 |
| r8 | 0 | −1.86E−03 | 2.98E−04 | −3.68E−05 | 1.59E−06 |
| r10 | 0 | 2.17E−02 | 2.47E−03 | −5.45E−04 | 2.83E−05 |
| r11 | 0 | 2.88E−02 | −1.32E−03 | 6.35E−04 | −7.61E−05 |

TABLE 4

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | 50.100 | 0.500 | | | 1.49208 | 67.04 |
| r2 | 6.578 | 0.800 | | | 1.92286 | 20.88 |
| r3 | 8.776 | 0.500 | | | 1.51790 | 52.31 |
| r4* | 4.409 | 5.679 | 1.742 | 0.500 | | |
| r5 | ∞ | 0.100 | | | | |
| r6* | 3.395 | 1.163 | | | 1.85000 | 40.04 |
| r7 | −5.113 | 2.158 | | | 1.76175 | 23.82 |
| r8* | 4.316 | 0.961 | 5.371 | 8.063 | | |
| r9* | −13.113 | 1.006 | | | 1.84941 | 35.75 |
| r10* | −4.815 | 2.423 | 1.348 | 0.500 | | |
| r11 | ∞ | 0.500 | | | 1.51680 | 64.20 |
| r12 | ∞ | 0.500 | | | | |
| r13 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | −5.16E−03 | 4.04E−04 | −1.55E−05 | 2.30E−07 |
| r4 | 0 | −8.39E−03 | 5.76E−04 | −1.86E−05 | −4.43E−07 |
| r6 | 0 | −1.16E−03 | −3.66E−04 | 2.27E−04 | −6.70E−05 |
| r8 | 0 | 1.15E−02 | 4.02E−04 | 5.60E−04 | −4.44E−05 |
| r9 | 0 | −9.17E−04 | 5.42E−04 | −3.89E−05 | 1.69E−06 |
| r10 | 0 | 1.64E−03 | −3.29E−04 | −2.30E−05 | 1.43E−06 |

TABLE 5

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | 19.985 | 0.500 | | | 1.76995 | 49.05 |
| r2* | 2.381 | 0.927 | | | | |
| r3* | 4.108 | 0.802 | | | 1.92286 | 20.88 |
| r4* | 6.334 | 3.283 | 1.197 | 0.500 | | |
| r5 | ∞ | 0.100 | | | | |
| r6* | 2.409 | 1.168 | | | 1.75450 | 51.57 |
| r7* | −7.608 | 0.172 | | | | |
| r8* | −5.473 | 1.345 | | | 1.79850 | 22.60 |
| r9* | 6.822 | 0.933 | 5.827 | 9.114 | | |
| r10* | 9.902 | 1.697 | | | 1.60703 | 42.03 |
| r11* | −16.631 | 1.867 | 1.058 | 0.674 | | |
| r12 | ∞ | 0.500 | | | 1.51680 | 64.20 |
| r13 | ∞ | 0.500 | | | | |
| r14 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | −9.02E−05 | 2.27E−04 | −5.07E−05 | 3.13E−06 |
| r2 | 0 | −7.80E−03 | 1.48E−03 | −4.32E−05 | −8.16E−05 |
| r3 | 0 | −5.90E−03 | 1.91E−03 | −4.09E−05 | −3.96E−05 |
| r4 | 0 | −6.31E−03 | 1.85E−03 | −1.48E−04 | −3.23E−05 |
| r6 | 0 | −9.99E−04 | 2.10E−03 | −3.59E−04 | 2.38E−04 |
| r7 | 0 | 1.28E−02 | 2.14E−03 | −8.63E−04 | −8.47E−04 |
| r8 | 0 | 1.67E−02 | −3.71E−03 | −7.30E−04 | −1.67E−03 |
| r9 | 0 | 2.81E−02 | 4.53E−03 | −1.64E−03 | 8.44E−04 |
| r10 | 0 | 1.67E−03 | 4.01E−05 | −4.21E−06 | 2.66E−07 |
| r11 | 0 | 5.62E−03 | −3.84E−04 | 2.56E−05 | −7.88E−07 |

TABLE 6

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | 16.050 | 0.500 | | | 1.75450 | 51.57 |
| r2* | 2.965 | 1.838 | | | | |
| r3* | 8.312 | 1.067 | | | 1.92286 | 20.88 |

TABLE 6-continued

| | | | | | | |
|---|---|---|---|---|---|---|
| r4* | 15.081 | 5.683 | 2.227 | 0.500 | | |
| r5 | ∞ | 0.100 | | | | |
| r6* | 2.623 | 1.529 | | | 1.66559 | 55.17 |
| r7* | −5.551 | 0.237 | | | | |
| r8* | −3.476 | 2.105 | | | 1.80025 | 22.65 |
| r9* | −34.558 | 3.940 | 5.158 | 6.392 | | |
| r10 | ∞ | 0.500 | | | 1.51680 | 64.20 |
| r11 | ∞ | 0.500 | | | | |
| r12 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | 3.08E−04 | 2.10E−04 | −2.52E−05 | 8.39E−07 |
| r2 | 0 | −1.25E−03 | −4.06E−06 | 1.32E−04 | −2.19E−05 |
| r3 | 0 | −1.92E−03 | 2.39E−04 | −2.61E−05 | −4.50E−06 |
| r4 | 0 | −2.59E−03 | 2.51E−04 | −9.73E−05 | 4.27E−06 |
| r6 | 0 | 1.41E−03 | 1.19E−03 | 2.22E−04 | −5.77E−05 |
| r7 | 0 | 2.48E−02 | 1.97E−03 | −1.44E−03 | −9.76E−04 |
| r8 | 0 | 2.87E−02 | −4.53E−03 | −6.12E−04 | −1.44E−03 |
| r9 | 0 | 1.80E−02 | 1.08E−03 | −3.35E−04 | 8.42E−05 |

TABLE 7

| LENS SURFACE | RADIUS OF CURVATURE | AXIAL DISTANCE | | | REFRACTIVE INDEX | ABBE NUMBER |
|---|---|---|---|---|---|---|
| | | W | M | T | | |
| r1* | −14.833 | 0.700 | | | 1.49934 | 68.75 |
| r2 | 6.466 | 0.761 | | | 1.92286 | 20.88 |
| r3* | 7.851 | 5.646 | 1.751 | 0.500 | | |
| r4 | ∞ | 0.100 | | | | |
| r5* | 3.501 | 1.130 | | | 1.88300 | 40.80 |
| r6 | −5.623 | 2.366 | | | 1.79373 | 24.42 |
| r7* | 4.299 | 0.874 | 5.270 | 7.929 | | |
| r8* | −15.793 | 1.015 | | | 1.88300 | 40.80 |
| r9* | −5.130 | 2.355 | 1.297 | 0.500 | | |
| r10 | ∞ | 0.500 | | | 1.51680 | 64.20 |
| r11 | ∞ | 0.500 | | | | |
| r12 | ∞ | | | | | |

| LENS SURFACE | CONICAL COEFFICIENT | ASPHERICAL COEFFICIENT | | | |
|---|---|---|---|---|---|
| | | A | B | C | D |
| r1 | 0 | −9.31E−04 | 1.49E−04 | −6.36E−06 | 8.67E−08 |
| r3 | 0 | −1.21E−03 | 1.58E−04 | −4.18E−06 | −2.06E−07 |
| r5 | 0 | −1.09E−03 | −3.85E−04 | 2.87E−04 | −8.40E−05 |
| r7 | 0 | 1.11E−02 | 2.80E−04 | 6.24E−04 | −5.85E−05 |
| r8 | 0 | −1.14E−03 | 5.64E−04 | −3.95E−05 | 1.64E−06 |
| r9 | 0 | 1.35E−03 | 3.10E−04 | −1.85E−05 | 1.13E−06 |

FIG. 12 to FIG. 17 represents, in order from left to right, the spherical aberration, the astigmatism and the distortion aberration of the entire optical system according to the present second to seventh examples having the lens placements and constructions. The lens groups according to any of the examples exhibit chromatic aberrations and astigmatisms at the wide angle end (W), the middle point (M) and the telephoto end (T) within about 0.1 mm and distortion aberrations within about 5%, which are excellent optical characteristics. Further, Table 8 and Table 9 represent the focal lengths (with a unit of mm) and the F values at the wide angle end (W), the middle point (M) and the telephoto end (T), according to the second to seventh examples. These tables reveal that these examples can realize short-focus optical systems with excellent brightness similarly to the first example.

Further, Table 10 represents the values of the conditions (1) to (21) obtained with the first to seventh examples. It can be seen that the present examples can realize favorable values of any of the conditions.

TABLE 8

| | FOCAL LENGTH (mm) | | |
|---|---|---|---|
| | W | M | T |
| Example 1 | 3.9 | 7.8 | 11.1 |
| Example 2 | 4.7 | 7.1 | 9.4 |
| Example 3 | 4.0 | 7.9 | 11.2 |
| Example 4 | 4.6 | 9.2 | 13.0 |
| Example 5 | 3.5 | 6.9 | 9.8 |
| Example 6 | 3.5 | 5.3 | 7.0 |
| Example 7 | 4.4 | 8.8 | 12.6 |

TABLE 9

F NUMBER

|  | W | M | T |
|---|---|---|---|
| Example 1 | 3.0 | 4.6 | 5.9 |
| Example 2 | 2.8 | 3.7 | 4.5 |
| Example 3 | 2.9 | 4.3 | 5.4 |
| Example 4 | 2.8 | 4.3 | 5.6 |
| Example 5 | 2.8 | 4.5 | 5.8 |
| Example 6 | 3.5 | 4.1 | 4.7 |
| Example 7 | 2.8 | 4.4 | 5.6 |

TABLE 10

NUMERICAL TABLE FOR CONDITIONS

| CONDITION | Example 1 | Example 2 | Example 3 | Example 4 | Example 5 | Example 6 | Example 7 |
|---|---|---|---|---|---|---|---|
| (1) $\Delta N1max$ | 0.46 | 0.52 | 0.36 | 0.43 | 0.15 | 0.17 | 0.42 |
| (2) f2/fw | 1.91 | 1.11 | 1.47 | 1.26 | 1.28 | 1.43 | 1.30 |
| (3) Lb/fw | 0.47 | 0.28 | 0.31 | 0.29 | 0.44 | 2.05 | 0.30 |
| (4) Nmax | 1.99378 | 2.00330 | 1.92286 | 1.92286 | 1.92286 | 1.92286 | 1.92286 |
| (5) Nasp | — | 2.00330 | 1.92286 | 1.92286 | 1.92286 | 1.92286 | 1.92286 |
| (6) $\Delta v1max$ | 27.7 | 42.1 | 36.1 | 46.2 | 28.2 | 30.7 | 47.9 |
| (7) |f1p/f1| | 1.25 | 1.62 | 1.86 | 2.00 | 1.97 | 2.57 | 2.67 |
| (8) |f1/fw| | 3.26 | 2.57 | 2.75 | 2.63 | 1.59 | 2.06 | 2.66 |
| (9) |f1/ft| | 1.14 | 1.29 | 0.97 | 0.93 | 0.56 | 1.03 | 0.94 |
| (10) |f1n/f1p| | 0.45 | 0.41 | 0.36 | 0.64 | 0.33 | 0.26 | 0.28 |
| (11) N3p | 1.53048 | 2.00330 | 1.75661 | 1.84941 | 1.60703 | — | 1.88300 |
| (12) f2/ft | 0.67 | 0.55 | 0.52 | 0.44 | 0.45 | 0.72 | 0.46 |
| (13) $\Delta v2max$ | 15.2 | 14.2 | 25.6 | 16.2 | 29.0 | 32.5 | 16.4 |
| (14) |f2/f2p| | 1.04 | 1.04 | 1.25 | 1.09 | 1.42 | 1.72 | 1.07 |
| (15) N2p | 1.83864 | 1.84003 | 1.76134 | 1.85000 | 1.75450 | 1.66559 | 1.88300 |
| (16) f2/f3 | 0.97 | 0.61 | 0.83 | 0.68 | 0.42 | — | 0.70 |
| (17) $\alpha w$ | 16.9 | 23.5 | 22.2 | 22.4 | 25.0 | 24.3 | 23.1 |
| (18) |$\alpha w-\alpha t$| | 21.8 | 17.8 | 13.0 | 21.8 | 28.2 | 5.0 | 23.j1 |
| (19) Y'/TL | 0.14 | 0.26 | 0.15 | 0.20 | 0.18 | 0.18 | 0.20 |
| (20) fw/Tw | 0.18 | 0.38 | 0.23 | 0.29 | 0.25 | 0.20 | 0.28 |
| (21) ft/Tt | 0.53 | 0.75 | 0.68 | 0.82 | 0.55 | 0.46 | 0.79 |

As previously described, the image taking lens device incorporating the variable magnification optical system according to the present invention is compact and lightweight, and therefore it can be mounted to a digital apparatus such as a portable phone, and also enables photographing of static images or moving images with desired enlarging ratios. Further, it has optical characteristics applicable to high-pixel image pickup devices (image pickup devices with 2,000,000 pixel-class or more) and thus is advantageous over electronic zooming systems requiring interpolation.

Further, in addition to or instead of the embodiments, the present invention can be executed by modified embodiments as described in the following aspects (1) to (3).

(1) In the variable magnification optical systems according to the respective examples, the lenses having aspherical surfaces may be formed by molding or may be composite lenses made of a glass material and a resin material. Although glass materials usable with molding are limited, the use of molding enables mass production. On the other hand, a large number of glass materials can be employed as the substrates of composite lenses, and such composite lenses can have high degrees of flexibilities in design. In general, it is relatively difficult to fabricate, by molding, aspherical lenses made of high-refractive materials as those in the present invention, and therefore the advantages of composite type lenses can be maximally utilized.

(2) In the variable magnification optical systems according to the respective examples, there may be provided a mechanical shutter having a function of light shield for the image pickup device, as the optical stop (ST). In the case of providing such a mechanical shutter, it is possible to prevent occurrence of smears which may be caused by, for example, use of a CCD system as the image pickup device.

(3) In the variable magnification optical systems according to the respective examples, it is possible to employ a cam or stepping motor for driving the respective lens groups, the stop or the shutter, as conventional. Also, in the case where smaller movements are required or the lens groups to be driven are relatively lightweight, microminiaturized piezo-electric actuators can be employed, in order to suppress increases in the size and the electric power consumption of the driving portion and enables individually driving the respective lens groups, thus further enhancing the compactness of the device.

According to the embodiments, the first lens group positioned most proximally to the object has a so-called negative-power-lead configuration, and therefore light rays incident from the object to the lens surfaces with large angles can be rapidly alleviated (largely refracted) with the negative power of the first lens group, thus enabling reduction of the size of the front lens diameter. Furthermore, with a negative-power-lead configuration, the total length of the optical system in the optical axis direction can be reduced, thereby enhancing the compactness of the entire system in comparison with a positive-power-lead configuration and also suppressing increases in the decentration error sensitivity even if the size is reduced.

Further, with the embodiments, since the first lens group includes at least one aspherical surface, it is possible to correct astigmatisms and distortion aberrations which are caused when the negative optical power of the first lens group is increased for compactness in the optical axis direction. Further, with the setting of $\Delta N1max$ of 0.35 or more, the Petzval sum can be reduced, thus enabling sufficiently correcting astigmatisms and field curvatures.

Further, according to the embodiments, with the setting of $0.7<f2/fw<2$, it is possible to suppress increases in the decentration error sensitivity of the second lens group and in the difficulty of fabrication of the lenses of the second lens group and also provide desired magnification ratios while maintaining the compactness of the variable magnification optical system. Further, with the setting of Lb/fw<1, the back focus can be shortened, thus enhancing the compactness.

Further, according to the embodiments, since the first lens group includes a meniscus lens which is convex at the object side thereof and has a positive refracting force and this meniscus lens has at least one aspherical surface, it is possible to further enhance the corrections of astigmatisms and distortion aberrations.

Further, according to the embodiment, in the variable magnification optical system, the first lens group positioned most proximally to the object has a so-called negative-power-lead configuration, and therefore light rays incident from the object to the lens surfaces with large angles can be rapidly alleviated (largely refracted) with the negative optical power of the first lens group. Further, with a negative-power-lead configuration, it is possible to suppress increases in the error sensitivity even if the size is reduced.

Further, according to the embodiments, with the setting of Nmax of 1.9 or more, it is possible to suppress increases in the aberration or the difficulty of fabrication of lenses, in comparison with the case of reducing the radii of curvatures of the lenses to provide an equivalent optical power. Further, with the setting of 0.7<f2/fw<2, it is possible to suppress increases in the decentration error sensitivity of the second lens group and the difficulty of fabrication of the lenses of the second lens group and also provide desired magnification ratios while maintaining the compactness of the variable magnification optical system.

Further, according to the embodiments, since the first lens group includes a meniscus lens which is convex at the object side thereof and has a positive refracting force and the refractive index of this meniscus lens is set to 1.9 or more, it is possible to minimize the increase of the Petzval sum, thus enabling sufficient correction of astigmatisms and field curvatures.

Further, according to the embodiments, the first lens group positioned most proximally to the object has a so-called negative-power-lead configuration, and therefore light rays incident from the object to the lens surfaces with large angles can be rapidly alleviated (largely refracted) with the negative optical power of the first lens group. Further, with a negative-power-lead configuration, it is possible to suppress increases in the error sensitivity even if the size is reduced.

Further, according to the embodiment, since the first lens group includes a meniscus lens which is convex at the object side thereof and has a positive refracting force, there is provided the effect of correcting astigmatisms. Further, since this meniscus lens includes at least one aspherical surface, the effect of correction can be further enhanced.

Further, according to the embodiment, with the setting of Nasp of 1.85 or more, it is possible to suppress the increase of the Petzval sum, thus enabling easily performing the correction of field curvatures and astigmatisms. Further, with the setting of 0.7<f2/fw<2, it is possible to suppress increases in the decentration error sensitivity of the second lens group and the difficulty of fabrication of the lenses of the second lens group and also provide desired magnification ratios while maintaining the compactness of the variable magnification optical system.

Further, according to the embodiments, since the first lens group includes at least one negative lens having a negative refracting power and at least one positive lens having a positive refracting power, it is possible to favorably correct chromatic aberrations of magnification. Further, with the setting of $\Delta v1max>25$, it is possible to prevent or avoid degradation of the contrast at the periphery of the screen, which may be caused when $\Delta v1max$ is lower than 25 resulting in insufficient corrections of chromatic aberrations of magnification.

Further, according to the embodiment, since the refractive index of the positive lens included in the first lens group is set to 1.85 or more, it is possible to minimize the increase of the Petzval sum, thus enabling sufficient correction of astigmatisms and field curvatures. This enables using only a single positive lens in the first lens group, thereby reducing the load on the driving system for the lenses, as well as enhancing the compactness.

Further, according to the embodiments, since the absolute value of f1p/f1 is set to within the range between 1 and 3, it is possible to prevent or avoid increases in the Petzval sum thus resulting in insufficient corrections of field curvatures and astigmatisms or reduction of the negative optical power of the first lens group thus increasing the difficulty of ensuring the back focus.

Further, according to the embodiments, since the third lens group having a positive optical power is provided at the image surface side of the second lens group, it is possible to reduce the movement of the second lens group in comparison with a negative-positive variable magnification optical system by the third lens group and cause the incident angles of off-axis light rays at the light-receptive surface to be closer to those of a telecentric system, thus ensuring the light quantity at the image pickup surface.

Further, according to the embodiment, since the fourth lens group having a negative optical power is provided at the image surface side of the third lens group, it is possible to improve the optical characteristics for proximal objects. Further, it is possible to bring the position of exit pupil closer to the object than the image pickup surface, thus reducing the difference in the incident angles of light rays at the light-receptive surface between at the wide angle end and at the telephoto end.

Further, according to the embodiments, since the third lens group is constituted by a single or two lenses and the third lens group is moved towards the object in the optical axis direction for performing infinity-to-proximity focusing, it is possible to provide clear images even for proximal objects without involving increases of the front lens diameter for focusing. Since the main functions of the third lens group are aiding the magnification and adjusting the incident angle of light at the image pickup device and thus a smaller load is imposed thereon in comparison with the other lens groups, a single or two lenses are sufficient to constitute the third lens group.

Further, according to the embodiment, since three or more lens groups are configured to be movable in the optical axis direction during magnification, it is possible to remove the inconvenience of impossibility of providing sufficient magnification ratios only by the movement of the second lens group, since the movement of the second group is restricted, in the case of enhancing the compactness of the variable magnification optical system.

If an attempt is made to enhance the compactness in the optical axis direction, this will involve increases of the decentration error sensitivity of the first lens group, thus necessitating the adjustment of the spacing of the lenses in the first lens group. On the other hand, according to the embodiments, since the first lens group includes cemented lenses, it is possible to significantly reduce the decentration error sensitivity of the respective lens surfaces in the first lens group, and if there is a need for adjustment of the spacing of lenses, it is possible to keep a good sensitivity balance. Further, it is possible to suppress occurrence of undesired light which is reflected between opposing lenses.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A variable magnification optical system which forms optical images of objects on the light-receptive surface of an image pickup device for converting optical images into electrical signals and performs magnification by varying the spacing of respective lens groups in the optical axis direction, said optical system comprising from the object side:
    a first lens group including plural lenses and at least one aspherical surface and having a negative optical power; and
    a second lens group having a positive optical power,
    wherein the spacing between the first lens group and the second lens group is reduced for magnification from the wide-angle end to the telephoto end and the following conditions are satisfied, $\Delta N1max \geq 0.35$ $0.7 < f2/fw < 2$ $Lb/fw < 1$ where
    $\Delta N1max$: the maximum value, out of the absolute values of the refractive index difference between two lenses, for all possible combinations of two lenses out of the lenses of the first lens group,
    f2: the total focal length of the second lens group,
    fw: the total focal length of the entire optical system at the wide-angle end,
    Lb: the distance between the peak point of the lens surface having a power which is most proximal to the image pickup device and the surface of the image pickup device along the optical axis at the telephoto end.

2. A variable magnification optical system according to claim 1, wherein the first lens group includes a positive meniscus lens which is convex at the object side thereof, and the meniscus lens has at least one aspherical surface.

3. A variable magnification optical system according to claim 1, wherein the first lens group includes a negative lens and a positive lens, and wherein the following condition is satisfied:

$\Delta v1max > 25$, where
    $\Delta v1max$: the maximum value out of the absolute values of the Abbe number differences between positive and negative lenses out of the lenses of the first lens group.

4. A variable magnification optical system according to claim 1, wherein the first lens group consists of a positive lens, the refractive index of the positive lens is equal to or greater than 1.85, and the following condition is satisfied:

$1 < |f1p/f1| < 3$ where
    f1p: the focal length of the positive lens in the first lens group,
    f1: the total focal length of the first lens group.

5. A variable magnification optical system according to claim 1, further comprising a third lens group which has a positive optical power, and is arranged in an image side of the second lens group.

6. A variable magnification optical system according to claim 5, further comprising a fourth lens group which has a negative optical power, and is arranged in an image side of the third lens group.

7. A variable magnification optical system according to claim 5, wherein the third lens group consists of a single or two lenses, and an infinity-to-proximity focusing is performed by moving the third lens group towards the object.

8. A variable magnification optical system according to claim 5, wherein three or more lens groups moves in the optical axis direction during magnification.

9. A variable magnification optical system according to claim 1, wherein the first lens group includes a cemented lens.

10. A variable magnification optical system which forms optical images of objects on the light-receptive surface of an image pickup device for converting optical images into electrical signals and performs magnification by varying the spacing of respective lens groups in the optical axis direction, said optical system comprising from the object side:
    a first lens group having a negative optical power; and
    a second lens group having a positive optical power,
    wherein the spacing between the first lens group and the second lens group is reduced for magnification from the wide-angle end to the telephoto end and the following conditions are satisfied, $Nmax \geq 1.9$ $0.7 < f2/fw < 2$ where
    Nmax: the refractive index of a lens having a largest refractive index, out of the lenses in the variable magnification optical system,
    f2: the total focal length of the second lens group,
    fw: the total focal length of the entire optical system at the wide-angle end.

11. A variable magnification optical system according to claim 10, wherein the first lens group includes a positive meniscus lens which is convex at the object side thereof, and the refractive index of the meniscus lens is set to 1.9 or more.

12. A variable magnification optical system according to claim 10, wherein the first lens group includes a negative lens and a positive lens, and wherein the following condition is satisfied:

$\Delta v1max > 25$, where
    $\Delta v1max$: the maximum value out of the absolute values of the Abbe number differences between positive and negative lenses out of the lenses of the first lens group.

13. A variable magnification optical system according to claim 10, wherein the first lens group consists of a positive lens, the refractive index of the positive lens is equal to or greater than 1.85, and the following condition is satisfied:

$1 < |f1p/f1| < 3$ where
    f1p: the focal length of the positive lens in the first lens group,
    f1: the total focal length of the first lens group.

14. A variable magnification optical system according to claim 10, further comprising a third lens group which has a positive optical power, and is arranged in an image side of the second lens group.

15. A variable magnification optical system according to claim 14, further comprising a fourth lens group which has a negative optical power, and is arranged in an image side of the third lens group.

16. A variable magnification optical system according to claim 14, wherein the third lens group consists of a single or two lenses, and an infinity-to-proximity focusing is performed by moving the third lens group towards the object.

17. A variable magnification optical system according to claim 14, wherein three or more lens groups moves in the optical axis direction during magnification.

18. A variable magnification optical system according to claim 10, wherein the first lens group includes a cemented lens.

19. A variable magnification optical system which forms optical images of objects on the light-receptive surface of an image pickup device for converting optical images into electrical signals and performs magnification by varying the spacing of respective lens groups in the optical axis direction, said optical system comprising from the object side:
a first lens group of a negative optical power, which includes a positive meniscus lens, including at least one aspherical surface, and being convex at the object side thereof; and
a second lens group having a positive optical power,
wherein the spacing between the first lens group and the second lens group is reduced for magnification from the wide-angle end to the telephoto end and the following conditions are satisfied, $Nasp \geq 1.85$ $0.7 < f2/fw < 2$ where
Nasp: the refractive index of a lens having a largest refractive index, out of the lenses having an aspherical surface,
f2: the total focal length of the second lens group,
fw: the total focal length of the entire optical system at the wide-angle end.

20. A variable magnification optical system according to claim 19, wherein the first lens group includes a negative lens and a positive lens, and wherein the following condition is satisfied:

$\Delta v1max > 25$, where
$\Delta v1max$: the maximum value out of the absolute values of the Abbe number differences between positive and negative lenses out of the lenses of the first lens group.

21. A variable magnification optical system according to claim 19, wherein the first lens group consists of a positive lens, the refractive index of the positive lens is equal to or greater than 1.85, and the following condition is satisfied:

$1 < |f1p/f1| < 3$ where
f1p: the focal length of the positive lens in the first lens group,
f1: the total focal length of the first lens group.

22. A variable magnification optical system according to claim 19, further comprising a third lens group which has a positive optical power, and is arranged in an image side of the second lens group.

23. A variable magnification optical system according to claim 22, further comprising a fourth lens group which has a negative optical power, and is arranged in an image side of the third lens group.

24. A variable magnification optical system according to claim 22, wherein the third lens group consists of a single or two lenses, and an infinity-to-proximity focusing is performed by moving the third lens group towards the object.

25. A variable magnification optical system according to claim 22, wherein three or more lens groups moves in the optical axis direction during magnification.

26. A variable magnification optical system according to claim 19, wherein the first lens group includes a cemented lens.

27. An image taking apparatus comprising:
image pickup elements for converting an optical image to an electrical signal; and
a variable magnification optical system that forms an optical image of the object on a receiving surface of said imaging elements and performs variable power by changing the distance between each lens group in an optical axis direction,
wherein said optical system including from the object side:
a first lens group including plural lenses and at least one aspherical surface and having a negative optical power; and
a second lens group having a positive optical power,
wherein the spacing between the first lens group and the second lens group is reduced for magnification from the wide-angle end to the telephoto end and the following conditions are satisfied, $\Delta N1max \geq 0.35$ $0.7 < f2/fw < 2$ $Lb/fw < 1$ where
$\Delta N1max$: the maximum value, out of the absolute values of the refractive index difference between two lenses, for all possible combinations of two lenses out of the lenses of the first lens group,
f2: the total focal length of the second lens group,
fw: the total focal length of the entire optical system at the wide-angle end,
Lb: the distance between the peak point of the lens surface having a power which is most proximal to the image pickup device and the surface of the image pickup device along the optical axis at the telephoto end.

28. An image taking apparatus comprising:
imaging elements for converting an optical image to an electrical signal; and
a variable magnification optical system that forms an optical image of the object on a receiving surface of said imaging elements and performs variable power by changing the distance between each lens group in an optical axis direction,
wherein said optical system including from the object side:
a first lens group having a negative optical power; and
a second lens group having a positive optical power, wherein the spacing between the first lens group and the second lens group is reduced for magnification from the wide-angle end to the telephoto end and the following conditions are satisfied, $Nmax \geq 1.9$ $0.7 < f2/fw < 2$ where Nmax: the refractive index of a lens having a largest refractive index, out of the lenses in the variable magnification optical system, f2: the total focal length of the second lens group, fw: the total focal length of the entire optical system at the wide-angle end.

29. An image taking apparatus comprising:

imaging elements for converting an optical image to an electrical signal; and a variable magnification optical system that forms an optical image of the object on a receiving surface of said imaging elements and performs variable power by changing the distance between each lens group in an optical axis direction, wherein said optical system including from the object side:

a first lens group of a negative optical power, which includes a positive meniscus lens, including at least one aspherical surface, and being convex at the object side thereof; and a second lens group having a positive optical power, wherein the spacing between the first lens group and the second lens group is reduced for magnification from the wide-angle end to the telephoto end and the following conditions are satisfied, $Nasp \geq 1.85$ $0.7 < f2/fw < 2$ where Nasp: the refractive index of a lens having a largest refractive index, out of the lenses having an aspherical surface, f2: the total focal length of the second lens group, fw: the total focal length of the entire optical system at the wide-angle end.

30. A digital apparatus comprising an image taking unit which includes imaging elements for converting an optical image to an electrical signal, and a variable power optical system that forms an optical image of the object on a receiving surface of said imaging elements and performs variable power by changing the distance between each lens group in an optical axis direction, wherein said optical system includes from the object side:

a first lens group including plural lenses and at least one aspherical surface and having a negative optical power; and a second lens group having a positive optical power, wherein the spacing between the first lens group and the second lens group is reduced for magnification from the wide-angle end to the telephoto end and the following conditions are satisfied, $\Delta N1max \geq 0.35$ $0.7 < f2/fw < 2$ $Lb/fw < 1$ where $\Delta N1max$: the maximum value, out of the absolute values of the refractive index difference between two lenses, for all possible combinations of two lenses out of the lenses of the first lens group, f2: the total focal length of the second lens group, fw: the total focal length of the entire optical system at the wide-angle end, Lb: the distance between the peak point of the lens surface having a power which is most proximal to the image pickup device and the surface of the image pickup device along the optical axis at the telephoto end.

31. A digital apparatus comprising an image taking unit which includes imaging elements for converting an optical image to an electrical signal, and a variable power optical system that forms an optical image of the object on a receiving surface of said imaging elements and performs variable power by changing the distance between each lens group in an optical axis direction, wherein said optical system includes from the object side:

a first lens group having a negative optical power; and a second lens group having a positive optical power, wherein the spacing between the first lens group and the second lens group is reduced for magnification from the wide-angle end to the telephoto end and the following conditions are satisfied, $Nmax \geq 1.9$ $0.7 < f2/fw < 2$ where Nmax: the refractive index of a lens having a largest refractive index, out of the lenses in the variable magnification optical system, f2: the total focal length of the second lens group, fw: the total focal length of the entire optical system at the wide-angle end.

32. A digital apparatus comprising an image taking unit which includes imaging elements for converting an optical image to an electrical signal, and a variable power optical system that forms an optical image of the object on a receiving surface of said imaging elements and performs variable power by changing the distance between each lens group in an optical axis direction, wherein said optical system includes from the object side:

a first lens group of a negative optical power, which includes a positive meniscus lens including at least one aspherical surface and being convex at the object side thereof; and a second lens group having a positive optical power, wherein the spacing between the first lens group and the second lens group is reduced for magnification from the wide-angle end to the telephoto end and the following conditions are satisfied, $Nasp \geq 1.85$ $0.7 < f2/fw < 2$ where Nasp: the refractive index of a lens having a largest refractive index, out of the lenses having an aspherical surface, f2: the total focal length of the second lens group, fw: the total focal length of the entire optical system at the wide-angle end.

* * * * *